US012603862B2

(12) United States Patent
Fenton et al.

(10) Patent No.: US 12,603,862 B2
(45) Date of Patent: Apr. 14, 2026

(54) METHODS AND SYSTEMS FOR EFFICIENT ADAPTIVE LOGGING OF CYBER THREAT INCIDENTS

(71) Applicant: Centripetal Networks, LLC, Portsmouth, NH (US)

(72) Inventors: John Fenton, Ashburn, VA (US); Peter Geremia, Portsmouth, NH (US); Richard Goodwin, York, ME (US); Sean Moore, Hollis, NH (US); Vincent Mutolo, Portsmouth, NH (US); Jess P. Parnell, Grayson, GA (US); Jonathan R. Rogers, Hampton Falls, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/820,959

(22) Filed: Aug. 30, 2024

(65) Prior Publication Data

US 2025/0247363 A1     Jul. 31, 2025

Related U.S. Application Data

(63) Continuation of application No. 18/207,419, filed on Jun. 8, 2023, now Pat. No. 12,113,771, which is a
(Continued)

(51) Int. Cl.
*H04L 9/40*          (2022.01)

(52) U.S. Cl.
CPC ...... *H04L 63/0236* (2013.01); *H04L 63/1425* (2013.01); *H04L 63/1458* (2013.01)

(58) Field of Classification Search
CPC ............. H04L 63/0236; H04L 63/1425; H04L 63/1458
See application file for complete search history.

(56) References Cited

U.S. PATENT DOCUMENTS

| | | | |
|---|---|---|---|
| 5,226,141 | A | 7/1993 | Esbensen |
| 6,098,172 | A | 8/2000 | Coss et al. |

(Continued)

FOREIGN PATENT DOCUMENTS

| | | | |
|---|---|---|---|
| AU | 2005328336 B2 | 9/2011 | |
| AU | 2006230171 B2 | 6/2012 | |

(Continued)

OTHER PUBLICATIONS

Sourcefire 3D System User Guide, Version 4.10, Mar. 16, 2011, 2123 pages.

(Continued)

*Primary Examiner* — Vance M Little
(74) *Attorney, Agent, or Firm* — Banner & Witcoff, Ltd.

(57)          ABSTRACT

A packet-filtering network appliance such as a threat intelligence gateway (TIG) protects TCP/IP networks from Internet threats by enforcing certain policies on in-transit packets that are crossing network boundaries. The policies are composed of packet filtering rules derived from cyber threat intelligence (CTI). Logs of rule-matching packets and their associated flows are sent to cyberanalysis applications located at security operations centers (SOCs) and operated by cyberanalysts. Some cyber threats/attacks, or incidents, are composed of many different flows occurring at a very high rate, which generates a flood of logs that may overwhelm computer, storage, network, and cyberanalysis resources, thereby compromising cyber defenses. The present disclosure describes incident logging, in which a single incident log efficiently incorporates the logs of the many flows that comprise the incident, thereby potentially reducing resource consumption while improving the informational/cyberanalytical value of the incident log for cyberanalysis when compared to the component flow logs. Incident logging vs. flow logging can be automatically and (Continued)

adaptively switched on or off depending on the combination of resource consumption and informational/cyberanalytical value.

20 Claims, 6 Drawing Sheets

Related U.S. Application Data continuation of application No. 18/075,121, filed on Dec. 5, 2022, now Pat. No. 11,736,440, which is a continuation of application No. 17/838,478, filed on Jun. 13, 2022, now Pat. No. 11,539,664, which is a continuation of application No. 17/380,519, filed on Jul. 20, 2021, now Pat. No. 11,362,996.

(60) Provisional application No. 63/106,166, filed on Oct. 27, 2020.

(56) References Cited

U.S. PATENT DOCUMENTS

| | | | |
|---|---|---|---|
| 6,147,976 A | 11/2000 | Shand et al. |
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,662,235 B1 | 12/2003 | Callis et al. |
| 6,678,835 B1 | 1/2004 | Shah et al. |
| 6,826,694 B1 | 11/2004 | Dutta et al. |
| 6,907,042 B1 | 6/2005 | Oguchi |
| 6,971,028 B1 | 11/2005 | Lyle et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,227,842 B1 | 6/2007 | Ji et al. |
| 7,237,267 B2 | 6/2007 | Rayes et al. |
| 7,254,114 B1 | 8/2007 | Turner et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,320,022 B2 | 1/2008 | Hayter et al. |
| 7,331,061 B1 | 2/2008 | Ramsey et al. |
| 7,478,429 B2 | 1/2009 | Lyon |
| 7,499,412 B2 | 3/2009 | Matityahu et al. |
| 7,539,186 B2 | 5/2009 | Aerrabotu et al. |
| 7,594,270 B2 | 9/2009 | Church et al. |
| 7,610,621 B2 | 10/2009 | Turley et al. |
| 7,684,400 B2 | 3/2010 | Govindarajan et al. |
| 7,710,885 B2 | 5/2010 | Ilnicki et al. |
| 7,721,084 B2 | 5/2010 | Salminen et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,849,502 B1 | 12/2010 | Bloch et al. |
| 7,913,303 B1 | 3/2011 | Rouland et al. |
| 7,954,143 B2 | 5/2011 | Aaron |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,149 B2 | 10/2011 | Judge |
| 8,042,167 B2 | 10/2011 | Fulp et al. |
| 8,117,655 B2 | 2/2012 | Spielman |
| 8,156,206 B2 | 4/2012 | Kiley et al. |
| 8,176,561 B1 | 5/2012 | Hurst et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,413,238 B1 | 4/2013 | Sutton |
| 8,422,391 B2 | 4/2013 | Zhu |
| 8,495,725 B2 | 7/2013 | Ahn |
| 8,510,821 B1 | 8/2013 | Brandwine et al. |
| 8,726,379 B1 | 5/2014 | Stiansen et al. |
| 8,806,638 B1 | 8/2014 | Mani |
| 8,832,832 B1 | 9/2014 | Visbal |
| 8,839,417 B1 | 9/2014 | Jordan |
| 8,856,926 B2 | 10/2014 | Narayanaswamy et al. |
| 8,918,838 B1 | 12/2014 | Baldonado et al. |
| 8,935,785 B2 | 1/2015 | Pandrangi |
| 9,094,445 B2 | 7/2015 | Moore et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,185,127 B2 | 11/2015 | Neou et al. |
| 9,342,691 B2 | 5/2016 | Maestas |
| 9,392,003 B2 | 7/2016 | Amsler |
| 9,413,722 B1 | 8/2016 | Ahn et al. |
| 9,419,942 B1 | 8/2016 | Buruganahalli et al. |
| 9,503,529 B2 | 11/2016 | Li et al. |
| 9,531,672 B1 | 12/2016 | Li et al. |
| 9,634,911 B2 | 4/2017 | Meloche |
| 9,686,193 B2 | 6/2017 | Moore |
| 10,205,733 B1 | 2/2019 | Park et al. |
| 2001/0039579 A1 | 11/2001 | Trcka et al. |
| 2001/0039624 A1 | 11/2001 | Kellum |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0015905 A1 | 1/2004 | Huima |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0240447 A1 | 12/2004 | Dorbolo et al. |
| 2004/0250124 A1 | 12/2004 | Chesla et al. |

(56) References Cited

U.S. PATENT DOCUMENTS

| | | |
|---|---|---|
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0193429 A1 | 9/2005 | Demopoulos et al. |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0257264 A1 | 11/2005 | Stolfo et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0097976 A1 | 5/2007 | Wood et al. |
| 2007/0118894 A1 | 5/2007 | Bhatia |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0103524 A1 | 4/2009 | Mantripragada et al. |
| 2009/0138938 A1 | 5/2009 | Harrison et al. |
| 2009/0150972 A1 | 6/2009 | Moon et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0249482 A1 | 10/2009 | Sarathy |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2011/0320870 A1 | 12/2011 | Kenigsberg et al. |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0113987 A1 | 5/2012 | Riddoch et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0047020 A1 | 2/2013 | Hershko et al. |
| 2013/0055373 A1 | 2/2013 | Beacham et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0212680 A1 | 8/2013 | Winn et al. |
| 2013/0254766 A1 | 9/2013 | Zuo et al. |
| 2013/0262655 A1 | 10/2013 | Deschenes et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0208420 A1 | 7/2014 | Mraz et al. |
| 2014/0215561 A1 | 7/2014 | Roberson et al. |
| 2014/0215574 A1 | 7/2014 | Erb et al. |
| 2014/0259170 A1 | 9/2014 | Amsler |
| 2014/0280778 A1 | 9/2014 | Paxton |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0337613 A1 | 11/2014 | Martini |
| 2014/0366132 A1 | 12/2014 | Stiansen et al. |
| 2015/0033336 A1 | 1/2015 | Wang et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0191558 A1 | 6/2016 | Davison |

(56)                    References Cited

U.S. PATENT DOCUMENTS

| | | | |
|---|---|---|---|
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0308894 A1 | 10/2016 | Ahn et al. |
| 2016/0366099 A1 | 12/2016 | Jordan |
| 2017/0142144 A1 | 5/2017 | Weinberger et al. |
| 2017/0223046 A1 | 8/2017 | Singh |
| 2017/0272469 A1 | 9/2017 | Kraemer et al. |
| 2017/0324709 A1 | 11/2017 | Ahn et al. |
| 2018/0288074 A1 | 10/2018 | Thayer et al. |
| 2019/0373052 A1 | 12/2019 | Pollitt et al. |
| 2021/0067538 A1 | 3/2021 | Mishra et al. |
| 2021/0226865 A1 | 7/2021 | Gupta et al. |

FOREIGN PATENT DOCUMENTS

| | | | |
|---|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2482522 A1 | 8/2012 |
| EP | 2498442 A1 | 9/2012 |
| EP | 1864226 B1 | 5/2013 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |
| WO | 2012146265 A1 | 11/2012 |
| WO | 2016196683 A1 | 12/2016 |

OTHER PUBLICATIONS

Nichols, et al., "Definition of the Differentiated Services Field (DS Field) in the IPv4 and IPv6 Headers," Network Working Group RFC 2474, Dec. 1998, 20 pages.

Perkins, "IP Encapsulation with IP," Network Working Group RFC 2003, Oct. 1996, 14 pages.

Blake, et al., "An Architecture for Differentiated Services," Network Working Group RFC 2475, Dec. 1998, 36 pages.

Cisco ACNS Software Configuration Guide for Centrally Managed Deployments, Release 5.5 ("ACNS Guide"), 2006, 944 pages.

Ylonen, et al., "The Secure Shell (SSH) Transport Layer Protocol," SSH Communication Security Corp, Network Working Group RFC 4253, Jan. 2006, 32 pages.

Ingate Firewall/SIParator® SIP Security Best Practice ("Ingate"), published Sep. 2, 2008, 15 pages.

Bradner, "The Internet Standards Process—Revision 3," Network Working Group RFC 2026, Oct. 1996, 36 pages.

J. Frahim, et al., "Cisco ASA: All-in-One Firewall, IPS, and VPN Adaptive Security Appliance," Cisco Press 2006, first printed Oct. 2005, 54 pages.

Golnabi, et al., "Analysis of Firewall Policy Rules Using Data Mining Techniques," 2006 IEEE, pp. 305-315.

C. Fellin, et al., "Preventing Mistraining of Anomaly-Based IDSs through Ensemble Systems," 2014 IEEE 10th World Congress on Services, (2014) pp. 66-69.

Feb. 22, 2022—(EP) Communication with Extended European Search Report—App 21197561.01.

"Control Plane Policing Implementation Best Practices"; Cisco Systems; Mar. 13, 2013; <https://web.archive.org/web/20130313135143/http:www.cisco.com/web/about/security/intelligence/coppwp_gs.html>.

Reumann, John; "Adaptive Packet Filters"; IEEE, 2001, Department of Electrical Engineering and Computer Science, The University of Michigan, Ann Arbor, MI.

Greenwald, Michael; "Designing an Academic Firewall: Policy, Practice, and Experience with Surf"; IEEE, Proceedings of SNDSS, 1996.

Mizuno et al., A New Remote Configurable Firewall System for Home-use Gateways, Jan. 2005. Second IEEE Consumer Communications and Networking Conference, pp. 599-601.

Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.

Kindervag, et al. "Build Security Into Your Network's DNA: The Zero Trust Network Architecture," Forrester Research Inc.; Novermber 5, 2010, pp. 1-26.

Palo Alto Networks; "Designing a Zero Trust Network With Next-Generation Firewalls"; pp. 1-10; last viewed on Oct. 21, 2012.

Fulp, Errin: "CV: Errin Fulp," XP002618346, www.cs.wfu.edu/fulp/ewfPub.html, pp. 1-5 (Copyright 2010).

Acharya et al, "OPTWALL: a Hierarchical Traffic-Aware Firewall," Department of Computer Science, Telecommunications Program, University of Pittsburgh, pp. 1-11 (2007).

Tarsa et al., "Balancing Trie-Based Policy representations for Network Firewalls," Department of Computer Science, Wake Forest University, pp. 1-6 (2006).

Fulp, "Trie-Based Policy Representations for Network Firewalls," Proceedings of the IEEE International Symposium on Computer Communications (2005).

E. Fulp, "Optimization of Network Firewall Policies Using Ordered Sets and Directed Acyclical Graphs", Technical Report, Computer Scient Department, Wake Forest University, Jan. 2004.

E. Fulp et al., "Network Firewall Policy Tries", Technical Report, Computer Science Department, Wake Forest University, 2004.

E. Al-Shaer et al., "Modeling and Management of Firewall Policies", IEEE Transactions on Network and Service Management, 1(1): 2004.

E.W. Fulp, "Firewall Architectures for High Speed Networks", U.S. Department of Energy Grant Application, Funded Sep. 2003.

E. Al-Shaer et al., "Firewall Policy Advisor for Anomaly Discovery and Rule Editing", Proceedings of the IFIP/IEEE International Symposium on Integrated Network Management, 2003.

V.P. Ranganath, "A Set-Based Approach to Packet Classification", Proceedings of the IASTED International Conference on Parallel and Distributed Computing and Systems, 889-894, 2003.

M. Christiansen et al., "Using IDDs for Packet Filtering," Technical Report, BRICS, Oct. 2002.

Lee et al., "Development Framework for Firewall Processors," IEEE, pp. 352-355 (2002).

L. Qui et al., "Fast Firewall Implementations for Software and Hardware-Based Routers", Proceedings of ACM Sigmetrics, Jun. 2001.

D. Eppstein et al., "Internet Packet Filter Management and Rectangle Geometry", Proceedings of the Symposium on Discrete Algorithms, 827-835, 2001.

E. Fulp, "Preventing Denial of Service Attacks on Quality of Service", Proceedings of the 2001 DARPA Information Survivability Conference and Exposition II, 2001.

S. Goddard et al., "An Unavailability Analysis of Firewall Sandwich Configurations", Proceedings of the 6th IEEE Symposium on High Assurance Systems Engineering, 2001.

G.V. Rooij, "Real Stateful TCP Packet Filtering in IP Filter", Proceedings of the 10th USENIX Security Symposium, 2001.

P. Warkhede et al., "Fast Packet Classification for Two-Dimensional Conflict-Free Filters", Proceedings of IEEE INFOCOM, 1434-1443, 2001.

D. Decasper et al., "Router Plugins: a Software Architecture for Next-Generation Routers", IEEE/ACM Transactions on Networking, 8(1): Feb. 2000.

A. Feldmann et al., "Tradeoffs for Packet Classification", Proceedings of the IEEE INFOCOM, 397-413, 2000.

X. Gan et al., "LSMAC vs. LSNAT: Scalable Cluster-based Web servers", Journal of Networks, Software Tools, and Applications, 3(3): 175-185, 2000.

A. Hari et al., "Detecting and Resolving Packet Filter Conflicts", Proceedings of IEEE INFOCOM, 1203-1212, 2000.

(56)          References Cited

OTHER PUBLICATIONS

O. Paul et al., "A full Bandwidth ATM Firewall", Proceedings of the 6th European Symposium on Research in Computer Security ESORICS'2000, 2000.

J. Xu et al., "Design and Evaluation of a High-Performance ATM Firewall Switch and Its Applications", IEEE Journal on Selected Areas in Communications, 17(6): 1190-1200, Jun. 1999.

C. Benecke, "A Parallel Packet Screen for High Speed Networks", Proceedings of the 15th Annual Computer Security Applications Conference, 1999.

R. Funke et al., "Performance Evaluation of Firewalls in Gigabit-Networks", Proceedings of the Symposium on Performance Evaluation of Computer and Telecommunication Systems, 1999.

S. Suri et al., "Packet Filtering in High Speed Networks", Proceedings of the Symposium on Discrete Algorithms, 969-970, 1999.

U. Ellermann et al., "Firewalls for ATM Networks", Proceedings of INFOSEC'COM, 1998.

V. Srinivasan et al., "Fast and Scalable Layer Four Switching", Proceedings of ACM SIGCOMM, 191-202, 1998.

M. Degermark et al., "Small Forwarding Tables for Fast Routing Lookups", Proceedings of ACM SIGCOMM, 4-13, 1997.

S.M. Bellovin et al., "Network Firewalls", IEEE Communications Magazine, 50-57, 1994.

W.E. Leland et al., "On the Self-Similar Nature of Ethernet Traffic", IEEE Transactions on Networking, 2(1); 15, 1994.

G. Brightwell et al., "Counting Linear Extensions is #P-Complete", Proceedings of the Twenty-Third Annual ACM Symposium on Theory of Computing, 1991.

M. Al-Suwaiyel et al., "Algorithms for Trie Compaction", ACM Transactions on Database Systems, 9(2): 243-263, Jun. 1984.

D. Comer, "Analysis of a Heuristic for Full Trie Minimization", ACM Transactions on Database Systems, 6(3): 513-537, Sep. 1981.

R.L. Graham et al., "Optimization and Approximation in Deterministic Sequencing and Scheduling: a Survey", Annals of Discrete Mathematics, 5: 287-326, 1979.

E.L. Lawler, "Sequencing Jobs to Minimize Total Weighted Completion Time Subject to Precedence Constraints", Annals of Discrete Mathematics, 2: 75-90, 1978.

J.K. Lenstra et al., "Complexity of Scheduling Under Precedence Constraints", Operations Research, 26(1): 22-35, 1978.

R. Rivest, "On Self-Organizing Sequential Search Heuristics", Communications of the ACM, 19(2): 1976.

W.E. Smith, "Various Optimizers for Single-Stage Productions", Naval Research Logistics Quarterly, 3: 59-66, 1956.

Bellion, "High Performance Packet Classification", http://www.hipac. org (Publication Date Unknown).

Singh, Rajeev et al. "Detecting and Reducing the Denial of Service attacks in WLANs", Dec. 2011, World Congress on Information and Communication TEchnologies, pp. 968-973.

Chen, et al, "Research on the Anomaly Discovering Algorithm of the Packet Filtering Rule Sets," Sep. 2010, First International Confererence on Pervasive Computing, Signal Processing and Applications, pp. 362-366.

Ylonen, et al, "The Secure Shell (SSH) Transport Layer Protocol," SSH Communication Security Corp, Newtork Working Group RFC 4253, Jan. 2006, 32 pages.

Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.

"Cisco ACNS Softward Configuration Guide for Centrally Managed Deployments," Release 5.5. Text Part No. OL-9136-01, Cisco Systems, Inc., 2006, 944 pages.

Blake, et al., "An Architecture for Differentiated Services," also known as the Diffserv architecture, as defined in RFC 2475, Network Working Group, Dec. 1998, 36 pages.

"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.

Apr. 2, 20218—U.S. Non-Final Office Action—U.S. Appl. No. 15/382,806.

Valdes, et al., "Probabilistic Alert Correlation," 2001, downloaded from <<http://citeseerx.ist.psu.edu/viewdoc/download?doi=10.1.1.15.3371&rep=rep1&type=pdf>> (Year: 2001), pp. 54-68.

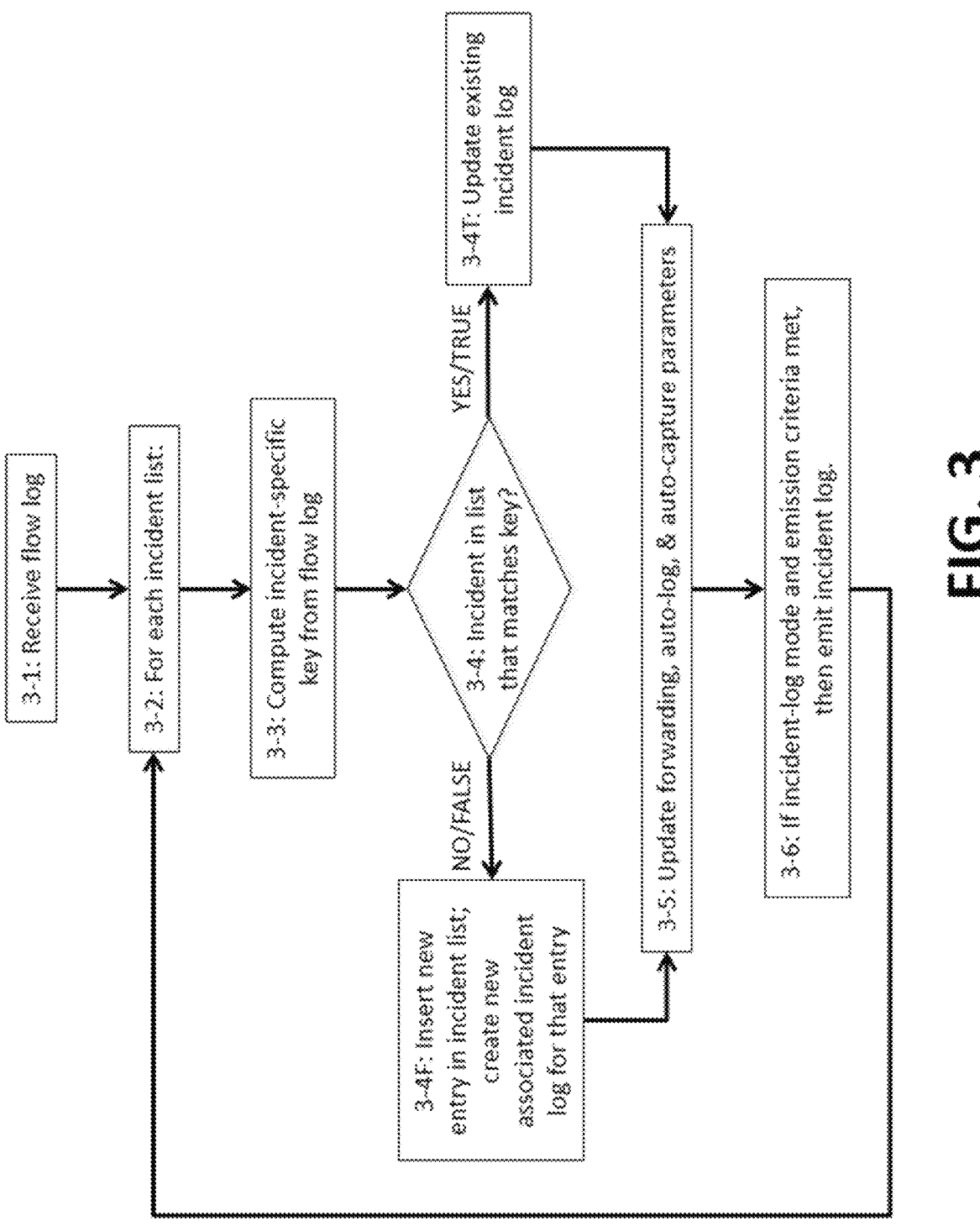

3-1: Receive flow log 3-2: For each incident list:

3-3: Compute incident-specific key from flow log 3-4: Incident in list that matches key?

YES/TRUE 3-4T: Update existing incident log

NO/FALSE 3-4F: Insert new entry in incident list; create new associated incident log for that entry 3-5: Update forwarding, auto-log, & auto-capture parameters 3-6: If incident-log mode and emission criteria met, then emit incident log.

FIG. 3

METHODS AND SYSTEMS FOR EFFICIENT ADAPTIVE LOGGING OF CYBER THREAT INCIDENTS

CROSS-REFERENCE TO RELATED APPLICATIONS

This application is a continuation of U.S. patent application Ser. No. 18/207,419, filed Jun. 8, 2023, which is a continuation of U.S. patent application Ser. No. 18/075,121, filed Dec. 5, 2022 and issued as U.S. Pat. No. 11,736,440, which is a continuation of U.S. patent application Ser. No. 17/838,478, filed Jun. 13, 2022 and issued as U.S. Pat. No. 11,539,664, which is a continuation of U.S. patent application Ser. No. 17/380,519, filed Jul. 20, 2021 and issued as U.S. Pat. No. 11,362,996, which claims priority to U.S. provisional patent application Ser. No. 63/106,166, filed Oct. 27, 2020, all of which are hereby incorporated by reference as to their entireties.

FIELD

Aspects described herein generally relate to computer hardware and software, and network security, cyber security, and associated cyber defense. In particular, one or more aspects of the disclosure generally relate to computer hardware and software for efficient logging of cyber threat incidents that adaptively minimizes usage of computer network resources for logging while maximizing the logs' informational value for cyber analysis and cyber defense applications. The efficient, adaptive logging may mitigate some Denial-of-Service (DoS) attacks on cyber defense applications and systems.

BACKGROUND

TCP/IP network security is becoming increasingly important as the information age continues to unfold. Network threats and associated attacks may take a variety of forms (e.g., unauthorized requests or data transfers, viruses, malware, large volumes of traffic designed to overwhelm resources, and the like).

To counter these threats/attacks, various cyber defense methodologies and systems have been developed and deployed. An important component of cyber defense is packet-filtering network appliances that apply sets of packet filtering rules to in-transit Layer 3 Internet Protocol (L3/IP) packets and determine whether to allow/forward each packet toward its destination or block/drop the packet. These network appliances are often inserted inline into links located at the boundaries between a private network (such as an enterprise network) and the public Internet and are configured with a set of packet filtering rules, or a policy, that is designed to protect or otherwise secure the private network in some way. For example, early-generation network firewalls are typically configured with packet filtering rules that enforce a private network's access control policies, such as which Internet services (e.g., well-known ports associated with Internet hosts) that internal hosts are allowed to access, and conversely which internal resources can be accessed by which (unsolicited) Internet hosts. For another example, current-generation packet-filtering network appliances include threat intelligence gateways (TIGs), which may be configured with packet filtering rules with packet matching criteria that correspond to the network addresses, e.g., IP addresses, 5-tuple values, domain names, URIs, and the like, of cyber threats that have been identified by cyber threat intelligence (CTI) providers.

In addition to the block or allow action on matching packets, the packet filtering rules applied by these network appliances may also include actions such as a "log", or "packet-log", directive to log matching packets, which may be executed by the appliances' packet-filtering application logic. In the cyber security context, the resultant logs may be the basis/input for cyber analysis applications operated by cyberanalysts that may process the logs in order to determine, for example, the current cyber defense posture and current cyber threat situational awareness, as well as to determine protective, defensive, and/or remedial actions to improve defenses. A packet log may include, for example: information contained in the packet (e.g., header field values, TCP flag values, payload size, etc.); environmental information such as time-of-day and date, direction, identifier and location of the network appliance that observed/filtered the packet, ingress and egress network interfaces, etc.; matching rule information such as the block or allow action, matching criteria (which may correspond to CTI), metadata associated with the matching rule (e.g., CTI provider identifier, CTI feed identifier, etc.); and the like.

It may be the case that the size of the packet log (e.g., measured in bytes) may approach or even exceed the size of the packet. When there are many (threat) packets being logged, for example, during some port scan attacks, DDoS attacks, large file transfers (e.g. malware downloads, exfiltrations, etc.), and the like, then the computer and network resources (processing, storage, bandwidth, etc.) consumed by the packet logs may be excessive or even overwhelming. This excessive/overwhelming consumption of resources may adversely affect the performance of the network appliances, networks, cyber analysis applications and associated platforms, security operations centers (SOCs) hosting the applications, the (human and machine) cyberanalysis resources at the SOCs who may be operating the applications, etc., that may comprise a cyber defense system.

In order to reduce resource usage/consumption but without decreasing informational value for cyberanalysis applications and cyberanalysts, the packet logs for the multiple packets comprising the same bi-directional flow (which may be characterized as packets with the same combination of source and destination IP address values and port values and same protocol value, i.e., the 5-tuple) may be aggregated or synthesized into a single log for the flow. To minimize system-wide resource consumption, this aggregation/synthesis operation may be performed by the network appliance. Thus, instead of multiple packet logs, the single corresponding flow log may be the input to cyberanalysis applications. Furthermore, the packet filtering rules (and associated logic executed by the network appliance) may include a "flow-log" directive that signals the application logic executed by the network appliance to map a matching packet's log information into a corresponding flow log. A flow log may significantly reduce resource consumption by, for example, including only one copy of certain information that is common across all of the packets in the flow, such as the 5-tuple values, and aggregating/synthesizing other information, such as the packets' application-layer payload sizes, into a single value for the flow. In the cyber context, the transformation of multiple packets' logs into a single flow log may be done in a way that reduces resource consumption (e.g., by reducing log file sizes) but does not decrease—and may even increase—the flow log's informational value for cyber analysis applications compared to the informational value of the corresponding multiple packet logs.

However, given at least these factors: (a) the ever-increasing size and ever-changing characteristics of the present Internet threat; (b) the growth of CTI and increased usage of CTI and TIGs to protect networks; and (c) the trend for SOCs to increase operational efficiencies by defending more and larger networks with relatively fewer human and machine cyberanalyst resources, then even flow logging may not be sufficient to prevent cyber defense resources from being overwhelmed, thereby compromising cyber defense. For example, a single cyber threat/attack incident on a single private network may be composed of many (e.g., hundreds of thousands) different flows occurring at a high rate (e.g., hundreds or even thousands of flows per second) and may last for several minutes, which may generate a corresponding number of packet and/or flow logs at a high rate that may overwhelm resources, thereby compromising cyber defenses. Similarly, packet capture functions may overwhelm resources during such incidents. In this context, an incident that causes cyber defense resources to be overwhelmed by logs and captures may be viewed as a denial-of-service (DoS) attack on the cyber defense system.

Thus, there is a need for methods and systems that will significantly reduce resource consumption for processing logs, without necessarily reducing the logs' informational value for cyber analysis and defense applications.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Methods, devices, systems, and/or computer-readable media storing executable instructions disclosed herein by way of example may provide efficient and adaptive cyber threat/attack logging components of network protection systems (e.g., enterprise network protection systems) and associated cyber defense systems. Network protection systems may include packet-filtering network appliances that may be configured with packet filtering rules and associated logic that may (1) detect in-transit packets that correspond to Internet threats, (2) log the threats at the granularity of each single packet and/or of single flows associated with the packets, and (3) capture the packets, i.e., store a copy of each packet. The appliances may send (e.g., immediately) the logs to cyber analysis applications that may be hosted in security operations centers (SOCs), where cyberanalyst humans and/or computing systems may analyze the logs to determine protective, defensive, and/or remedial actions. Some Internet threats/attacks, or incidents, however, may be composed of many different flows occurring at a high rate, which may generate many packet logs and/or flow logs and packet captures in a relatively short time interval that may overwhelm cyber defense system resources, including the cyberanalyst resources that may be located at the SOC, thereby compromising the associated cyber defense system.

The present disclosure also describes example methods, systems, apparatuses, and computer-readable media storing executable instructions that may produce an incident log (e.g., a single incident log) for an incident that may be composed of many different flows and packets, wherein the single incident log may (a) be smaller by one or more orders of magnitude than the corresponding collection of flow logs and/or packet logs that would otherwise be produced, but (b) have similar or possibly more informational value for cyber analysis applications, which may be operated by (human and/or machine) cyberanalysts. Furthermore, the logging mode to be utilized, for example a packet logging mode, a flow logging mode, or an incident logging mode, may be automatically selected or adapted to the current threat/attack environment, which may achieve an objective of minimizing cyber defense resource consumption by logging while simultaneously increasing or even maximizing the informational value of logs for cyberanalysts and associated cyber analysis applications. Similarly, a packet capture mode may be automatically selected or adapted to the current threat/attack environment by, for example, switching between capturing full packets and turning off packet capture or capturing only a portion of each packet in order to reduce resource consumption but without necessarily losing informational value for cyberanalysis.

Packet filtering rules may include directives for incident logging that, upon such a rule being applicable to (e.g., matching) an (in-transit) packet, may signal the network appliance's logic to incorporate the associated log-related information into the incident log or incident logs of one or more incidents that may be associated with the packet. Incident logging may be performed by the network appliance in order to reduce or even minimize resource consumption by the logging component of the associated cyber defense system and thereby potentially mitigate any resource overloading issues that may compromise the cyber defense system. Network appliances may include logic for automatically and efficiently: detecting, managing, and logging incidents; determining the one or more incidents to which a rule-matching packet and/or associated flow belongs; incorporating the log-related information of each rule-matching packet into the log or logs of one or more incidents; and/or distributing the incident logs to cyber analysis applications, which may be hosted by one or more SOCs. Network appliances may similarly include logic for automatically and efficiently turning off packet capture or reducing the portion of packets that may be captured. Cyber threat intelligence (CTI), which may be supplied by CTI provider (CTIP) organizations, may be used to increase or even maximize the efficiency and performance of the incident logging system and associated cyber defense system.

Some aspects as described herein are directed to methods and apparatuses such as a packet-filtering device that may be configured to perform the methods, such as by executing stored computer-readable instructions. For example, one such method may comprise receiving, by a packet-filtering device, a plurality of packet-filtering rules. The plurality of packet-filtering rules may have been determined based on a plurality of threat indicators that was determined based on cyber intelligence reports from a plurality of cyber threat intelligence providers. The method may further comprise logging, by the packet-filtering device and to produce flow log data (for example, a plurality of flow logs), a plurality of flows associated with a plurality of packets that each correspond to (for example, match) at least one of the plurality of packet-filtering rules. The method may further comprise sending, by the packet-filtering device, the flow log data. The method may further comprise logging, by the packet-filtering device and based on a flow logging rate exceeding a threshold flow logging rate, an incident associated with at least some of the plurality of flows. The method may further comprise sending, by the packet-filtering device, incident log data (for example, an incident log) indicating the incident.

Another example of such a method may comprise receiving, by a packet-filtering device, a plurality of packet-filtering rules. The plurality of packet-filtering rules may have been determined based on a plurality of threat indicators that was determined based on cyber intelligence reports from a plurality of cyber threat intelligence providers. The method may further comprise logging, by the packet-filtering device and based on at least one of the plurality of packet-filtering rules, a plurality of packets (for example, in a plurality of packet logs). The method may further comprise determining a plurality of different flows associated with the plurality of logged packets. The method may further comprise determining an incident associated with the plurality of different flows. The method may further comprise sending, by the packet-filtering device, an indication of the incident (for example, an incident log).

Yet another example of such a method may comprise receiving, by a packet-filtering device, a plurality of packet-filtering rules. The plurality of packet-filtering rules may have been determined based on a plurality of threat indicators that was determined based on cyber intelligence reports from a plurality of cyber threat intelligence providers. The method may further comprise logging, by the packet-filtering device (for example, in a plurality of flow logs), a plurality of flows associated with a plurality of received packets that each correspond to at least one of the plurality of packet-filtering rules. The method may further comprise determining a flow logging rate at which the plurality of flows are logged. The method may further comprise determining, based on the flow logging rate, that the plurality of flows are associated with an incident. The method may further comprise logging, by the packet-filtering device, the incident (for example, in an incident log). The method may further comprise sending, by the packet-filtering device, incident log data (for example, at least a portion of the incident log) associated with the incident.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 3 shows an example flow chart for performing efficient adaptive incident logging.

DETAILED DESCRIPTION

Figure 1:
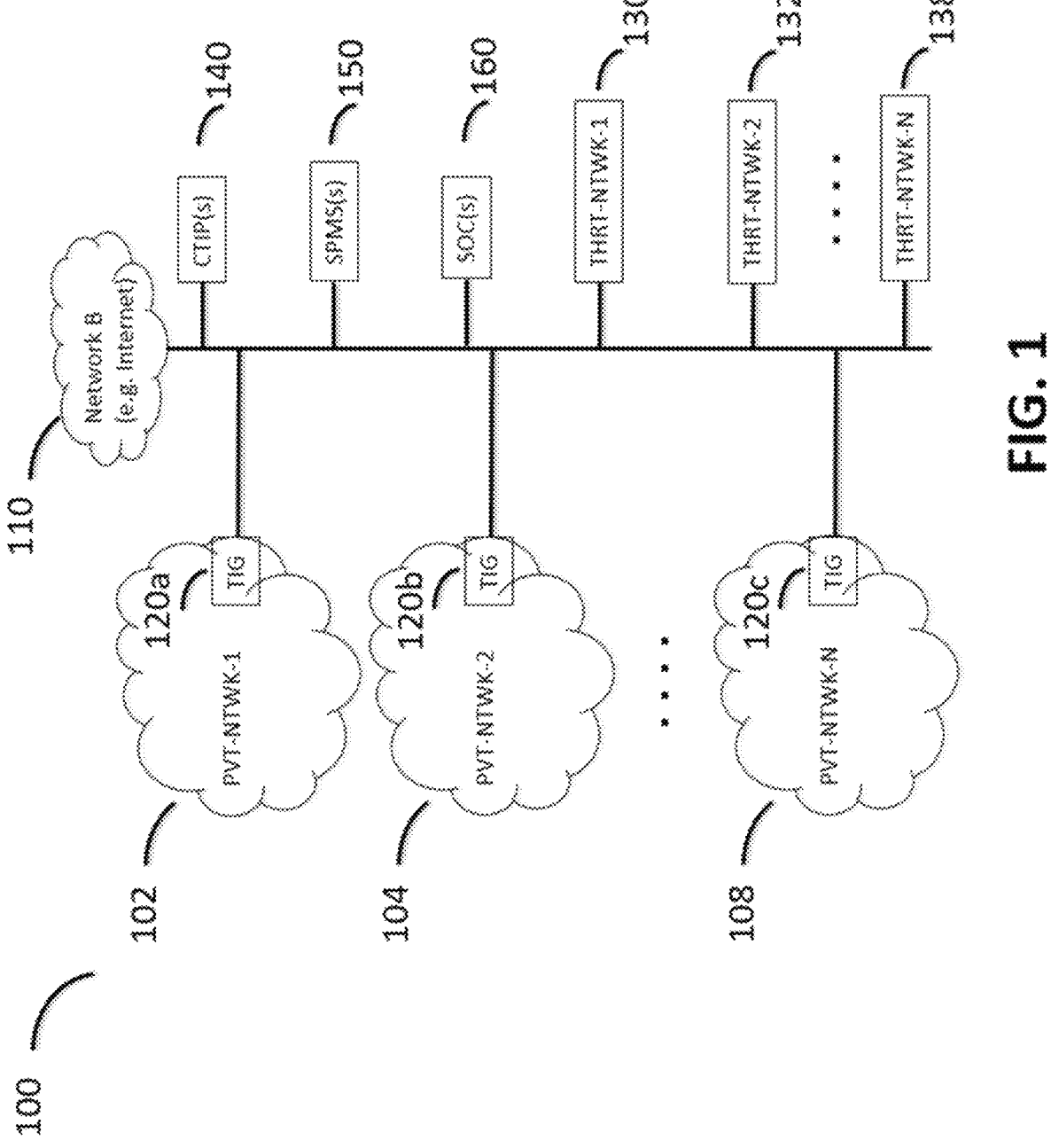
FIG. 1 shows an example environment for efficient adaptive logging of cyber threats.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure. It is to be understood that although the descriptions, figures, and examples may reference certain protocols such as the IPv4 protocol, the IPv6 protocol and other protocols may be similarly utilized.

Various connections between elements are discussed in the following description. These connections are general and, unless specified otherwise, may be direct or indirect, wired or wireless, physical or logical (e.g., virtual or software-defined), in any combination. In this respect, the specification is not intended to be limiting.

An important component of cyber defense is the use of packet-filtering devices or systems (also generally referred to herein as network appliances) that apply sets of packet filtering rules to in-transit Layer 3 (L3) packets and determine whether to allow/forward each packet toward its destination or block/drop the packet, i.e., to determine the packet's disposition. These network appliances may be inserted inline into links located at the boundary between a private network, such as an enterprise network, and the public Internet and may be configured with a set of packet filtering rules that is designed to protect or otherwise secure the private network in some way. Accordingly, the set of packet filtering rules defines a (network security) policy, and the network appliance enforces the policy.

For example, early-generation network firewalls and edge routers may be configured with packet filtering rules that enforce a private network's access control policies, such as which Internet services that internal hosts are allowed to access, and conversely which internal resources and services can be accessed by which (unsolicited) Internet hosts. The Internet services and internal resources and services may be identified by their IP addresses, Transmission Control Protocol/User Datagram Protocol (TCP/UDP) ports, and/or protocol types; accordingly, the packet filtering rules' matching criteria are often the packets' 5-tuple values, i.e., the (L3) source and/or destination IP address values, and/or (L4) source and/or destination port values, and/or (L3) protocol value.

For another example, intrusion detection systems (IDSs), intrusion prevention systems (IPSs), and next-generation firewalls may be configured with rules such as packet filtering rules, pattern matching rules, and/or signature matching rules that may enforce policies by inspecting packets' application-layer information, inspecting application-layer messages and files that may be segmented across multiple packets, and tracking network traffic patterns and behaviors.

For yet another example, and referring to FIG. 1, which shows a representative network environment 100, one or more current-generation packet-filtering network appliances, such as threat intelligence gateways (TIGs) 120*a*, 120*b*, 120*c*, may be configured with packet filtering rules. Where any arbitrary one of these TIGs 120*a*, 120*b*, 120*c* are referred to herein, or where they are referred to collectively, they will be referred to herein as simply TIG 120 or TIGs 120. The packet filtering rules may identify packet matching criteria that correspond to the network addresses and/or identifiers, e.g., IP addresses, 5-tuple values, (fully qualified) domain names, URIs, etc., or indicators, of cyber threats that have been identified by cyber threat intelligence (CTI) providers (CTIPs) 140. CTIPs 140 may continually identify Internet threats, create threat intelligence reports on the threats, determine indicators associated with the threats, and publish/stream lists, or feeds, of the threat indicators. The indicators may identify specific Internet hosts and/or specific resources managed by the hosts. Subscribers to these feeds may be, for example, one or more security policy management servers/services (SPMSs) 150 that may: consume multiple different feeds from multiple different CTIPs; aggregate the associated indicators (which may number in the millions) by, for example, removing duplicates and resolving address range overlaps; create sets of packet filtering rules (e.g., policies) with packet matching criteria corresponding to the threat indicators, with rule metadata corresponding to the CTIP(s) 140 and feed(s) that supplied the indicators, and with directives to, for example, log and/or flow-log matching packets, capture matching packets, etc.; and publish the policies to subscribers. The subscribers may be TIGs 120 that may be located at the boundary of and may comprise the interface between one or more private networks (e.g., 102, 104, . . . 108) and another network such as the Internet 110, and that may receive the policies and enforce the policies by applying them to network traffic (e.g., in-transit packets) that may pass through the TIGs 120.

During operation, communications via the Internet 110 may occur between hosts connected to the private networks 102, 104, . . . 108 (which may be protected by TIGs 120 enforcing network protection policies) and hosts connected to the networks 130, 132, . . . 138 (which may be associated with threats). The threat hosts may be associated with threat indicators that may be known to CTIPs 140. Accordingly, the TIGs 120 may be enforcing policies that include packet-filtering rules derived from the threat indicators, for example, packet-filtering rules with matching criteria that correspond to the threat indicators.

When a (in-transit) packet ingresses a TIG 120 and the TIG 120 determines that the packet satisfies (e.g., matches) a rule with directives, such as "log", "flow-log", "capture", etc., the TIG 120 may execute logic (e.g., implemented in the form of executable instructions, hardware, and/or firmware) associated with the directives. The matching packet may be an input to the logic. A (packet) log directive "log" and/or flow-log directive "flow-log" may cause the TIG logic to produce a log of the packet and/or of the associated flow (e.g., characterized by or identified with some combination or sub-combination of the packet's 5-tuple values) that may contain: information included in or otherwise derived from the packet, for example, values of header fields at each layer (e.g., 5-tuple information from L3 and L4), packet size, message content, message size, etc.; environmental information (not included in the packet), for example, packet observation time, ingress and egress interfaces, TIG identifier, TIG location, TIG operator/administrator, etc.; matching rule values, for example, disposition (e.g., block, allow), the matching criteria (e.g., the threat indicator(s)), metadata (e.g., the CTIP identifier, CTIP feed identifier, rule identifier, associated threat/attack type, etc.). For a flow log, in addition to the information in an associated packet log, information such as a flow identifier, flow direction, number of packets in the flow, number of bytes or other amount of data in the flow, TCP flags, connection state(s), start and end times, etc., may be included. Similarly, a packet capture directive "capture", or "pcap", may cause the TIG logic to copy the packet and store the copy in a packet capture file. Captured packets and their associated flows, for example, may be retrieved from storage (e.g., by cyberanalysts) in order to investigate/analyze an observed threat. Packet captures may be stored locally at the associated TIG 120 or on-premises by storage resources associated with the network associated with the TIG 120. Packet captures may be retrieved (e.g., by cyberanalysts) on an as-needed basis and often with permission of the organization that operates the associated network.

A TIG 120 may send the packet logs and/or flow logs to one or more Security Operations Centers (SOCs) 160. At a SOC, human and/or machine cyberanalysts may operate cyberanalysis applications that may ingest the logs, perform threat risk analysis, and determine possible remedial actions to improve network defenses. The cyberanalysis applications may be hosted by Security Information and Event Monitoring (SIEM) application platforms that are designed to ingest, store, and process log files.

There are some threats/attacks, however, that may cause a TIG 120 to generate large volumes of packet logs and/or flow logs and/or packet captures in a relatively short time interval. When such threats/attacks occur, local TIG computer resources, such as processing, memory, storage, and bandwidth, may be overwhelmed by the flood of logs and captures, which may cause not only loss of information but also loss of network protection. The logs may be sent via the Internet 110 to one or more SOCs 160, which may consume relatively large amounts of network bandwidth, especially at bottlenecks such as Internet access links, where packets may be dropped due to, for example, buffer overflows. Packet drops may cause TCP re-sends, which may further exacerbate network bandwidth consumption issues. At a SOC, the sudden flood of logs may similarly cause SOC computer resources to be overwhelmed, which similarly may cause loss of information and network protection. Furthermore, human and/or machine cyberanalysts at the SOC who are operating cyberanalysis applications similarly may be overwhelmed by the flood of logs, which may further compromise network protections and cyber defense. In this context, an incident that causes cyber defense system resources to be overwhelmed, and thereby compromise cyber defense, may be viewed as a denial-of-service (DoS) attack on the cyber defense system/service.

The threats/attacks (also referred to herein as incidents) that may cause these floods of logs, captures, and associated DoS attacks on cyber defense systems may be broadly characterized as being composed of many different flows that occur within a relatively short time interval, wherein the packets composing the flows will match or otherwise satisfy packet-filtering rules with log, flow-log, and capture directives that are applied by network appliances such as the TIGs 120. For example, port scan attacks, portsweep attacks, and various DDoS attacks may generate such floods. For example, a typical port scan attack may originate from the network THRT-NTWK-1 130, and from one or more hosts connected to network 130 with IPv4 addresses associated with the same /24 subnet (i.e., a contiguous block of 256 IPv4 addresses). The attack may target the private network PVT-NTWK-1 102, which may have a /24 block of public IPv4 addresses assigned to it by an Internet Service Provider (ISP). The operators of network PVT-NTWK-1 102 may have a network firewall/NAT (not shown in FIG. 1) deployed at the boundary between network 102 and the Internet 110, with an Internet-facing network interface associated with the /24 block of public IP addresses. (The NAT functions as a gateway/interface between the private IP address space of the private network 102 and the public IP address space of the Internet 110). Each public IP address of network 102 may be associated with up to 64K ports. A typical goal of a typical port scan attack is to (quickly) determine, for each public IP address of network 102, which ports are "open", i.e., associated with services that may be accessed by (unsolicited) Internet hosts. For example, a public-facing, publicly accessible Hypertext Transfer Protocol (HTTP) (web) server may be associated with the well-known port 80. Such a determination may be made, for example, by sending a TCP SYN packet to an IP address and port 80 combination and then observing if a TCP SYN-ACK packet is returned in response, which means that the server/service hosted by that IP address and port is accepting connections from (unsolicited) Internet hosts. Once a port is determined to be open, the attack may further interact with the service to determine, for example, the version of the service, the local operating system, hardware characteristics of the host, etc. The open port information may then be provided to a malicious actor or attacker that may, for example, exploit a known vulnerability of the associated service and/or host.

A typical port scan attack on a single private network may generate hundreds of thousands of different flows (e.g., flows with different 5-tuple values) in a short time interval and at a very high rate (e.g., hundreds, or even thousands, of flows per second), which may result in a TIG or other network appliance generating a corresponding amount and rate of flow logs and packet captures. The corresponding flow logs and packet captures may result in multiple megabytes/second of log data and capture data. Because a typical port scan may last for several minutes, this may result in multiple gigabytes of log data and capture data for the single incident associated with a single location (the location of the TIG or other network appliance). Because many enterprises may operate several private networks, where each network may be protected by a TIG or other network appliance, and because malicious actors often simultaneously target most or all of an enterprise's networks, the incident may generate tens or even hundreds of gigabytes of flow log data and packet capture data over the duration of the port scan attack. Some distributed Denial-of-Service (DDoS) attacks, which may share some characteristics of port scan attacks, may generate a similar volume and rate of flow log data and capture data but may be sustained for hours, days, weeks, months, or even years.

Note that the threats/attacks described above in reference to FIG. 1 assume that the threats/attacks are "inbound", i.e., that the originators of the threats/attacks may be Internet hosts that are targeting hosts connected to the private networks 102, 104, . . . 108. The methods and systems of the present disclosure also may apply to threats/attacks that are "outbound", i.e., that the originators of the threats/attacks may be hosts connected to the private networks 102, 104, . . . 108, which may be, for example, infected with malware that originate attacks targeting hosts such as in another network.

A purpose of the logs may be to immediately provide threat situational awareness to cyberanalysts at a SOC so that they may, for example: investigate/analyze the threat; make an attack/risk determination; and identify and execute remedial actions and/or protective actions and/or defensive actions. For incidents such as the exemplary port scan attacks noted above, the cyberanalysts may only require a relatively small set of data in order to protect/defend the network(s) vs. the relatively large set of data that (flow) logging may generate for such incidents. To effectively defend/protect the network, a cyberanalyst may only need to know, for example: the threat indicator(s) associated with the incident, e.g., the subnet(s) addresses (which may be efficiently represented in CIDR notation) of the originating threat hosts; the subnet(s) addresses of the target network; the network appliance/TIG identifier; the quantity of individual flows comprising the incident; the quantity of different ports that have been scanned; the start time and end time (or most recent reporting time) of the incident; flow rate(s) (e.g., average and maximum rates); the quantity of (TCP) connections that were made and which IP addresses and ports allowed connections; the identities of the CTIP(s) and CTI feed(s) that supplied the indicator(s) for the packet-filtering rule(s) that matched the events; and/or attack direction, i.e., inbound or outbound or both. Any of this data may be included in a single incident log, which may be smaller (e.g., when measured in bytes) by orders of magnitude than the collection of packet logs and/or flow logs generated by the incident. With such an incident log, a cyberanalyst may be able to protect/defend the network by, for example: investigating/analyzing the incident by accessing the associated CTIP(s)'s threat intelligence report(s) associated with the threat indicator(s), which may report the type, behavior, and goal of the attack, the attack attribution (e.g., malicious actor(s) behind the attack), etc.; determining if the network has vulnerabilities that have been or may be compromised, e.g., by analyzing the connections data; and determining remedial actions and/or protective actions and/or defensive actions, e.g., update the policy enforced by the network appliance or TIG with blocking packet-filtering rules with matching criteria corresponding to the indicators, report vulnerabilities and possible compromises to the administrators of the network associated with the network appliance or TIG, etc. Similarly, packet captures for every packet and associated flow that compose such incidents may not be necessary for cyberanalysis or may not be a significant factor in making cyberanalytic determinations. It may often be the case, for example where a port scan attack sends many TCP SYN packets to discover open connections, that no packet captures or only a small set of packet captures are needed for effective cyberanalysis.

In addition to port scan attacks, other types of attacks, e.g., portsweep attacks, DDoS attacks, etc., that may be characterized as being composed of many different flows (i.e., different bi-directional 5-tuple value combinations) occurring at a relatively high rate, may be similarly represented by incident logs that may be much smaller than the corresponding packet logs and/or flow logs. Although incident logs for different types of attacks may need some different information that characterizes the attack and that further assists cyberanalysts with protecting/defending the network, there are some characteristics and (efficiently represented) associated information that may be common across incident logs, for example any of the following:

the set of (threat) indicators associated with the attack/incident;

the set of network addresses associated with the target of the attack;

the set of ports associated with the target of the attack;

the time-of-day information associated with the attack/incident, which may include start time, end time, and/or intermediate report time;

volume and/or rate information associated with the flows comprising the attack/incident, for example, the total quantity of flows, the total quantity of different flows, the average rate and maximum rate of flows, the total byte count of the flows, etc.;

the identifier of the network appliance/TIG that observed and/or logged the attack/incident;

components of the packet-filtering rule(s) that matched or were otherwise satisfied by the packets comprising the attack/incident, for example, the disposition(s), matching criteria, and/or metadata (e.g., CTIP identifier, CTI feed identifier, etc.); and/or incident identification and/or characterization information, e.g., a (unique) identifier, type(s) of attack(s) associated with the incident, identifying information of the attacked network, attack direction, etc.

Each of the above common characteristics may have efficient representations of the associated information. These efficient representations may compress the associated information in such a way that the incident log size is reduced while not necessarily compromising cyberanalysts' ability to protect/defend the associated network. These efficient representations may vary, depending on, for example, the type of attack and/or other factors. For example, for a typical port scan attack, the threat indicators for the attack sources are often a small set of IP addresses from the same subnet (e.g., the same /24 subnet address) or even a single IP address, in which case the set of threat indicators may be efficiently represented using a single subnet address in CIDR notation without losing informational value for cyberanalysis, or cyberanalytical value, when compared to an enumeration of each IP address. Alternatively, if the set of IP addresses is small, the IP addresses may be listed directly. In any case, the cyberanalytical value, which may be measured as a function of information entropy, of these efficient representations of the attack sources/threat indicators in an incident log may be (much) higher (in the information entropy context) than the cyberanalytical value of the attack sources data contained in the corresponding flow logs, which may contain many thousands of copies of the attack sources/threat indicators. Whereas, for example, for a typical portsweep attack, the threat indicators may be many IP addresses that may be widely distributed across the Internet, in which case the set of many threat indicators may be efficiently represented using the few CTIP(s) identifier(s) and CTI feed identifier(s) associated with the many indicators without losing/lowering cyberanalytical value when compared to a listing of each IP address/threat indicator associated with the attack. Note, however, that for some portsweep attacks, the threat indicator(s) may be only one IP address or for example a small set of IP addresses from the same subnet address.

For another example of efficient representations that may depend on the type of attack, for a port scan attack, there may be many different ports that are scanned, in which case an efficient representation with high cyberanalytical value may be a single number representing the quantity of different ports scanned. Whereas for a portsweep attack, for example, there may be only one (well-known) port that is swept/scanned across the public IP addresses of the target/victim, in which case a single port value is an efficient representation with high cyberanalytical value (compared to the many copies of the port value contained in the corresponding flow logs).

Incident logging may be implemented by augmenting packet filtering rules' syntax with an "incident-log" directive and adding associated incident logging logic to the TIG or other packet-filtering network appliance that applies the rules to (in-transit) packets. Furthermore, an "auto-log" directive may be implemented that automatically (e.g., adaptively) selects the logging mode—such as packet logging, flow logging, and/or incident logging modes—that may reduce or even minimize resource consumption while increasing or even maximizing cyberanalytical value. The "auto-log" directive's logic may adaptively select a logging mode (e.g., an optimal logging mode) based on a combination of factors that may include, for example: (a) the current logging mode in effect (e.g., packet logging, flow logging, or incident logging); (b) the current packet's association with a threat/attack and the threat/attack's type; (c) cyberanalytical value; (d) resource consumption; and/or (e) threat awareness lag, i.e. the time interval between the observation/filtering time of a packet associated with a threat indicator and the time when the associated packet, flow, or incident log may be forwarded by the TIG (toward, for example, a host operating a cyberanalysis application, where the log may function as an alert/signal to a potential threat/attack, and/or to other TIG logic modules). In general, the threat awareness lag for packet logging may be minimal because a packet log can be created and forwarded at packet observation time; whereas the threat awareness lag for flow logging may be larger than that for packet logging because a flow log may not be forwarded until multiple associated packets/packet logs have been observed and incorporated into the flow log and/or a significant non-zero amount of time has elapsed since the most recent packet observation; and similarly, the threat awareness lag for incident logging may be larger than that for flow logging because an incident log may not be forwarded until multiple associated flows/flow logs have been observed and incorporated into the incident log and/or a significant non-zero amount of time has elapsed since the most recent flow log was incorporated into the incident log.

For example, when a packet matches or otherwise satisfies a rule with an auto-log directive, the auto-log logic, which may currently be in flow logging mode, may determine that the packet and associated flow are part of a (recently launched) multi-event, high-rate incident, and that transitioning to the incident logging mode would jointly optimize resource usage and cyberanalytical value. Furthermore, because the determination to transition to incident logging mode may have been based at least in part on the flow logging rate crossing a threshold (at least two flows associated with the attack may have been forwarded to a threat-awareness cyberanalysis application), then the application running the logic may be already aware of the threat associated with the incident and thus threat awareness lag time of incident logging may not be a factor. Later, when the incident/attack has stopped for some specific (e.g., predetermined) period of time and accordingly the rule has not matched or otherwise satisfied a packet for that period of time, then the next packet that matches or otherwise satisfies the rule may cause the auto-log logic to transition from incident logging mode to flow logging mode or packet logging mode. Another potential benefit of the auto-log directive is that when a packet filtering rule and associated policy are being created, the human or machine that is creating the packet filtering rule may not need to select a single (fixed) logging mode and thereby risk pre-selecting a logging mode that may be inefficient during operation and cannot be changed readily, for example, the change may be only be made by manually modifying the policy in response to the incident, which may be effectuated too slowly or even after the incident has completed.

Similarly, an "auto-capture" directive may be associated with a packet-filtering rule that may automatically and adaptively stop capturing packets or capture only a portion of the packets, for example the first 150 bytes of an IPv4 packet, during such incidents. The "auto-capture" logic may be coupled with the "auto-log" logic so that when the logging mode transitions, for example, from flow logging to incident logging, then packet capture may, for example, halt capturing or reduce the captured portion of the packets; and conversely, when the logging mode transitions from incident logging to flow logging, then full packet capture may resume. Accordingly, the auto-capture logic may support, and selectively and automatically switch between, modes such as "full-capture", "partial-capture", and "no-capture" of packets.

Although there are no required formal standards for packet filtering rule syntax and semantics, packet-filtering network appliances typically support packet filtering rules that generally conform to this high-level, exemplary, representative schema: <disposition><directives><matching-criteria>; <metadata>, where: <disposition> is one of block/ deny/drop or allow/pass/forward a packet that matches the rule; the <matching-criteria> correspond to Internet-layer (L3), transport-layer (L4), and/or application-layer header field values, such as some combination of source and destination IP addresses, source and destination ports, protocol, domain names, and/or URIs; and <metadata> is information associated with the rule that may be used to inform applications about the packet and/or rule, for example, the metadata may be included in an associated log that may be processed by a network situational awareness application. The <directives> may be information (such as commands, flags, etc.) that direct the operating application logic of the packet-filtering network appliance to process a matching packet according to the logic associated with the directive. For example, this logic may be additional packet-processing actions applied to a matching packet (e.g., signaled by directives such as "log", "flow-log", "capture", "mirror", "re-direct", etc.), whether or not to apply (e.g., conditionally apply) the rule upon packet ingress ("in") or upon packet egress ("out") or both ("in out"), whether or not to continue applying (e.g., conditionally continue applying) subsequent rules in the policy to the matching packet ("continue" or "quick"), or associating the rule with specific interfaces of the packet-filtering appliance, etc. For example, a rule "allow quick dst_port=80" will forward any (matching) packets destined for the well-known port 80 (HTTP service), in either direction (i.e., toward an Internet web/ HTTP server or toward an internal, public-facing web/HTTP server), and will stop searching for more rules in the policy that match the current packet; whereas a rule "block log dst_port=23" will drop any (matching) packets destined for the well-known port 23 (Telnet service) in either direction and will log the packet. The latter exemplary rule often may be used in practice because: (a) the Telnet remote login service is considered to be insecure, and thus any packets associated with Telnet should be dropped; and (b) the resultant logs may be used to inform network security applications and administrators about which internal hosts/ users are potentially compromising security by trying to use Telnet instead of, for example, well-secured SSH for remote logins, and also which Internet hosts/malicious actors are trying to find network vulnerabilities, for example, open Telnet ports, that may be exploited.

One approach to cyber defense is to filter packets associated with Internet threats, which are Internet hosts and/or resources managed by the Internet hosts that are associated with malicious activity. These threats may be researched and identified by cyber threat intelligence (CTI) provider organizations, which may publish CTI reports on the threats. The CTI reports may include threat indicators, which may identify network addresses such as in the form of IP addresses, 5-tuples, domain names, uniform resource identifiers (URIs), and/or the like, of specific Internet hosts and/or resources managed by specific Internet hosts that may be participating in malicious activity. As described above in reference to FIG. 1, the threat indicators may be collected from multiple CTI providers (CTIPs) 140 by multiple SPMSs 150, which may create sets/policies composed of packet filtering rules with "block" or "allow" dispositions, with matching criteria that correspond to the threat indicators, with metadata corresponding to the CTIP identifiers and/or CTI feed identifiers and/or associated information, and/or with directives such as the logging directives "log" (packet logging) and/or "flow-log" (flow logging), as well as the "incident-log" (incident logging), "auto-log" (adaptive logging), and/or "auto-capture" (adaptive capture) of the present disclosure. Such packet filtering rules generated from threat indicators may be hereafter referred to as "threat indicator rules". A set of threat indicator rules may comprise a "CTI-based policy" for protecting a network from Internet threats. Packet-filtering network appliances, such as those located at boundaries between private networks and the Internet, may be configured with these policies and may apply them to some or all in-transit packets traversing the boundaries. Such packet-filtering appliances that are configured with CTI-based policies and may be designed to enforce CTI-based policies are also referred to herein as Threat Intelligence Gateways, or TIGs (for example, element 120 in FIG. 1).

Regardless of disposition, the rules comprising CTI-based policies may include logging directives because the logs may be used by cyber analysis applications and associated cyber defense systems to identify threats/attacks and then to take actions to protect/defend the associated networks from the threats/attacks. The rules may also include packet capture directives to potentially assist with cyberanalyses. The TIG logic to execute logging directives may be efficient with respect to time and/or space complexity so that the TIG can process in-transit packets at line rate without significant, or any, performance degradation (e.g., without incurring latencies that may cause packet drops due to buffer overflows). The logic for "log" (i.e., packet logging) and "flow-log" directives may have efficient implementations because, for example, the log information may be efficiently collected using constant time (i.e., O(1)) algorithms that access structured information in the packet being filtered, the local environment, and/or the matching rule. For example, packet logging logic may access the packet's L3, L4, and/or application-layer packet header values, which are located in fixed positions or in efficiently computed positions (e.g., by using offsets). Similarly, environmental information (e.g., packet observation/filtering time) and rule metadata (e.g., CTIP name/identifier) may be efficiently accessed. Flow logging logic may use similar logic as packet logging but that is used for tracking and logging all of the packets in the bi-directional flow associated with the current filtered packet. Flow tracking logic may be efficiently implemented. For example, packets in the same bi-directional flow may be identified by the byte and/or bit string that may be efficiently computed as the concatenation of two or more fields in each packet, such as a concatenation of: (a) the bitwise XOR of the L3 source IP address and destination IP address (32 bits), (b) the bitwise XOR of the L4 source port and destination port (32 bits), and (c) protocol type (16 bits). The resultant string may be considered a direction-normalized flow character for the packet (as well as for the flow); i.e., every packet associated with the same bi-directional flow has the same (direction-normalized) flow character. The resultant string/flow character may be efficiently hashed using any of

Figure 6:
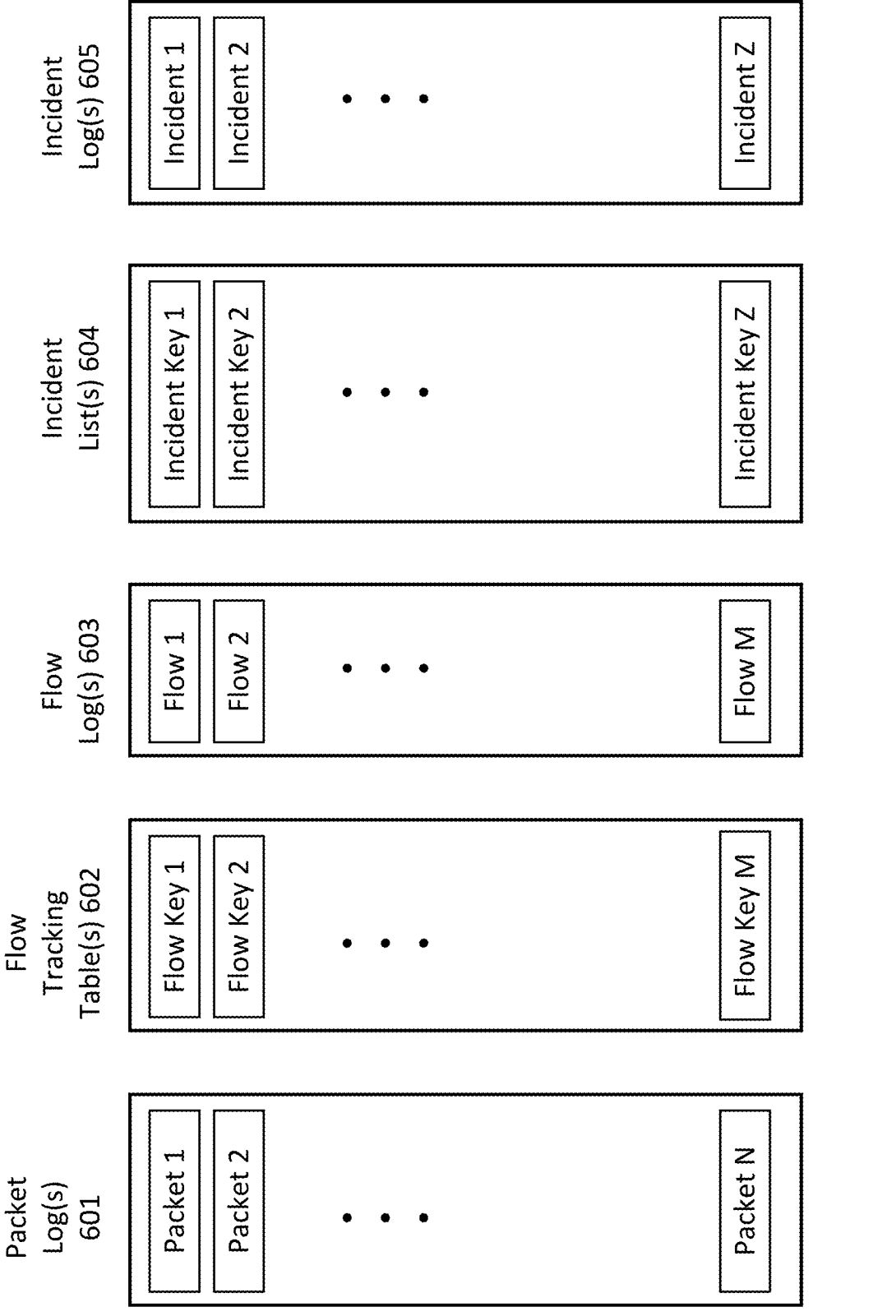
FIG. 6 shows example information that may be stored and used to implement any of the device, systems, and method described herein.

15 various known hash methods or any other hash method, and the resultant hash may be used as an index into a flow tracking table (which may have collision avoidance logic). The length of the resultant hash may correspond to the size of the flow tracking table; for example, the 80-bit flow character may be hashed to a 20-bit string, which may be used as an index into a flow tracking table with 2^20=over 1 million possible entries, i.e., a flow tracking table that may track up to about 1 million flows simultaneously. Each entry in the flow tracking table (see, e.g., flow tracking table 602 in FIG. 6) may contain a pointer into main memory that stores the flow information (which may include the original 5-tuple information) that may be used in the associated flow log (see, e.g., flow log 603). The flow information may include the log-relevant information that is common to each packet and/or packet log associated with the bi-directional flow and the log-relevant flow information that is different between each packet and/or packet log associated with the flow and log-relevant information that is cumulative over the packets and/or packet logs associated with the flow (e.g., flow payload size, flow duration, flow start and stop times, number of packets in the flow, etc.). A flow log may also contain a globally unique flow identifier "flow-ID", which may be computed, for example, from a combination of the flow character, the (normalized) arrival time (at the associated TIG) of the first packet in the flow, the (globally unique) TIG identifier, and/or other parameter values.

Flow logging logic may also include logic for determining when to forward and/or emit a flow log toward an application and/or toward incident logging logic. Whereas a packet log may be forwarded/emitted immediately upon packet observation/filtering because, for example, the packet log may not include or otherwise depend upon information associated with other packets, a flow log may not be forwarded/emitted immediately after each update of the flow log by an associated packet log. Instead, a flow log may be forwarded/emitted depending on some combination of, for example, the following factors:

elapsed time. For example, elapsed time since the most recent observation of a packet associated with the flow, and/or elapsed time since the flow log was most recently sent/forwarded/emitted (hereafter, "forwarded"). For example, as noted above, because a flow log may not be forwarded immediately after receiving and incorporating each associated packet/packet log, a threat awareness lag may be incurred that is larger than the lag associated with the associated packets/packet logs. Accordingly, the current threat awareness lag may be parameterized such that when a threshold value is crossed, then a flow log may be forwarded;

number of associated packets observed since the flow log was most recently forwarded;

packet rate. For example, a value of the packet rate of observed packets, and/or an indication of whether the rate of the observed packets crosses over a threshold value of packet rate, such as a predetermined threshold value of packet rate;

flow state transitions. For example, flow initiation, completion of the L4 (for example TCP) connection setup/handshake, initiation and/or completion of the L4 connection teardown, flow termination (caused by, for example, a TCP RST signal/packet), and/or failed connection attempt (caused by, e.g., TCP SYN packet being blocked); and/or current cyberanalytical value associated with the flow.

Figure 2:
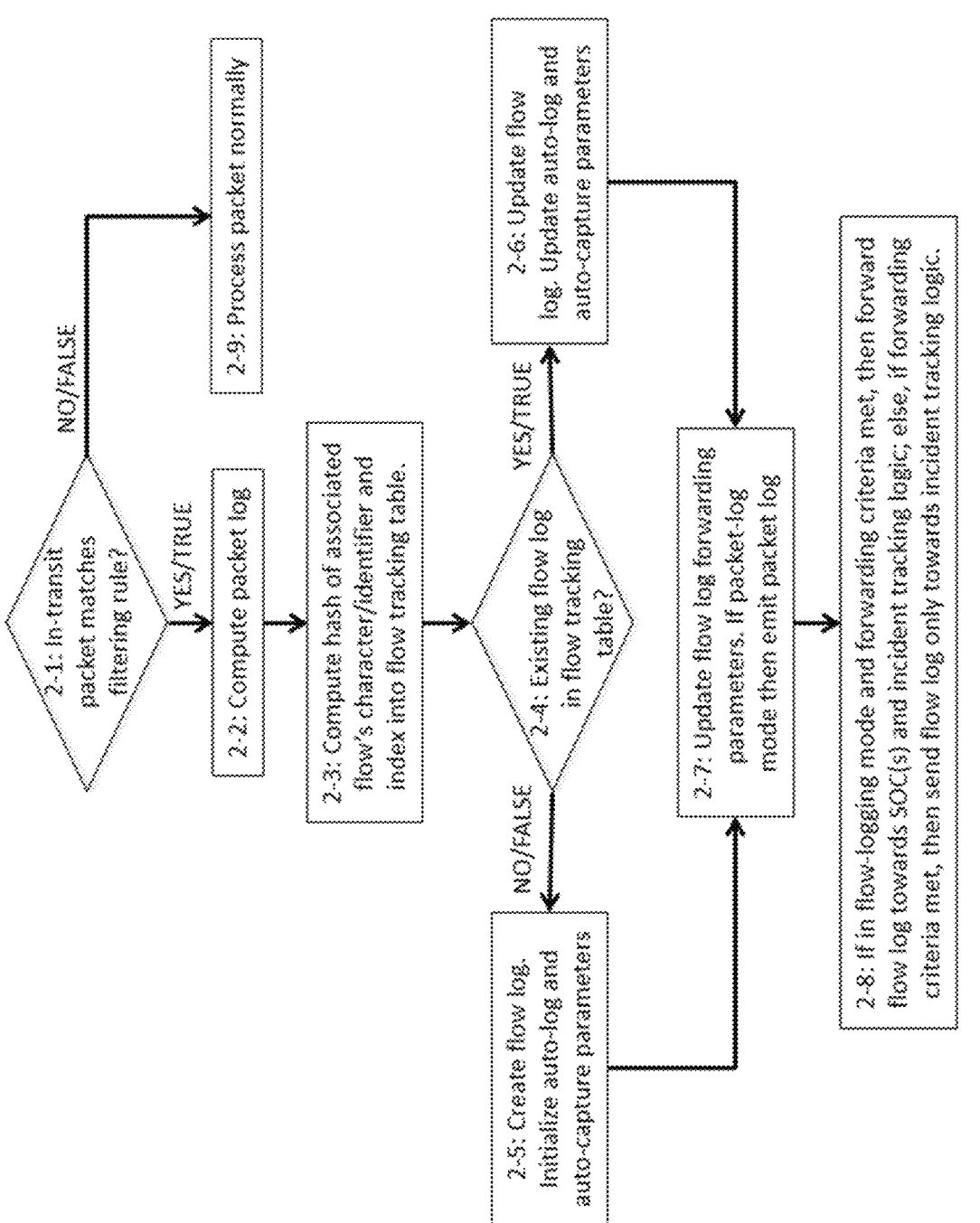
FIG. 2 shows an example flow chart for performing efficient adaptive flow logging.

Referring to FIG. 2, and in the context of incident logging, auto logging, and auto capture, an example of an adaptive flow logging logic/process may operate as follows. The process will be described by way of example as being at least partially performed by any of the TIGs 120 of FIG. 1. However, the process may be partially or fully performed by one or more other types of network appliances.

In Step 2-1, an in-transit packet matches or otherwise satisfies a TIG-enforced packet-filtering rule with a "flow-log" directive or with an "auto-log" directive.

In Step 2-2, if the in-transit packet matches or otherwise satisfies the packet-filtering rule of Step 2-1 (YES/TRUE branch), then the TIG's 120 logic may compute a packet log 601 (FIG. 6) for the matched packet. Otherwise (NO/FALSE branch), the in-transit packet is processed (e.g., forwarded) normally in Step 2-9.

In Step 2-3, the TIG's 120 logic may compute a hash of the packet's (direction-normalized) flow character. The hash may index into a flow tracking table 602.

In Step 2-4, the TIG 120 may check if there is an existing entry, e.g., a flow log 603 or an entry (e.g., a flow) in a flow log 603, indexed by the flow tracking table 602. If so (YES/TRUE branch), then in Step 2-6 the TIG 120 may update the flow log 603 with the information in the packet log 601 and update the parameters that may be used to cause auto-log transitions from packet logging to flow logging or vice versa; similarly, the TIG 120 may update the parameters that may be used for auto-capture, where the parameters may include a parameter with a value that indicates the type of auto-capture mode, such as one value for no capture mode, a second value for partial capture mode, and a third value for full capture mode. If no existing entry is found (NO/FALSE branch), then in Step 2-5 the TIG 120 may create a new entry, e.g., a flow log that is derived from the packet log 601, and set the auto-log mode to a predetermined value (where the value indicates the type of auto-log mode), such as an initial or default value (e.g., one of packet logging, flow logging, or incident logging mode); similarly, the TIG 120 may set the auto-capture mode to a predetermined value (where the value indicates the type of auto-capture mode), such as an initial or default value (e.g., a no capture, partial capture, or full capture mode).

In Step 2-7, the TIG may update one or more parameters associated with forwarding flow logs 603. If the matching rule referenced in Step 2-1 includes a "log" directive, e.g., a packet log directive, and/or if the current auto-log mode is packet logging, then the TIG 120 may forward the packet log toward the SOC(s) 160 associated with the TIG 120. If the matching rule referenced in Step 2-1 includes a "capture" directive, e.g., a packet capture directive, and/or if the current auto-capture mode is "full-capture" or "partial-capture", then the TIG 120 may copy the packet accordingly and store it in an associated packet capture file. This step (Step 2-7), Step 2-5, and/or Step 2-6 may also include changing auto-log and/or auto-capture modes. The parameters and/or mode may be updated based on one or more packet, flow, and/or incident measurements, and/or based on the filtering rules and/or other rules that define when auto-log parameters and mode, and/or auto-capture parameters and/or mode, are to be changed, and to what values they are to be changed to. Various example conditions have been described herein for determining when and whether parameters and modes should be changed. For example, TIG 120 may, based on a determination that the flow logging rate is high (for instance, the flow logging rate has exceeded a threshold flow logging rate, which may be predetermined), change the auto-log parameters and/or mode to incident logging mode, and/or to change the auto-capture parameters to cause TIG 120 to be in a different auto-capture mode.

In Step 2-8, if the matching rule referenced in Step 2-1 includes a "flow-log" directive and/or if the current auto-log mode is flow logging, and if the flow-log forwarding criteria has been met, then the TIG 120 may forward the flow log 603 toward the SOC(s) 160 associated with the TIG 120 that observed the packet in Step 2-1 and toward the incident tracking logic of that TIG 120 that observed the packet; else (e.g., where the logging mode is incident logging), if the flow-log forwarding criteria has been met, then the TIG 120 may forward the flow log 603 toward the incident tracking logic and not toward the SOC(s) 160 associated with the TIG 120.

In the cyber context, the terms "flow" and "flow log" may often correspond to the terms "event" and "event log". A communication between two endpoint hosts that may be associated with a threat may be called an event. A log of an end-to-end communication event, or event log, between two endpoint hosts that may be associated with a threat may provide high cyberanalytical value for cyber analysis applications. Because an end-to-end communication event is often segmented into multiple flows—for example, when a communication passes through an intermediate device (such as a firewall or NAT) that changes the 5-tuple values, an event log may be an aggregation/synthesis of the logs of two or more flows that compose the end-to-end communication event. Thus, an event log may reduce resource consumption but without decreasing, and possibly increasing, cyberanalytical value compared to the cyberanalytical value of the multiple flow logs.

Note that event logging may imply that each segment, e.g., each unique 5-tuple flow, that is part of an end-to-end communication event is observable and/or that the flow log of each segment is available for aggregation/synthesis. In some scenarios, the end-to-end communication event may be composed of only one flow/segment, i.e., there are no intermediate devices in the communication path that change the 5-tuple, in which case the event log and the flow log may be equivalent. In other scenarios, only one or some of the segments/flows of an event may be observable; and/or similarly, only one or some of the flow logs may be available. Event logging logic may also need to determine which segments/flows and/or flow logs are components of the same communications events in order to synthesize an event log for a multi-segment/multi-flow communication event. In any case, the term "event log" as used herein may, in context, refer to any of these scenarios. As such, herein the terms "event log" and "flow log", as well as "event" and "flow", may be used interchangeably in context. Similarly, references to "flow" and "flow log" of the present disclosure may equivalently be references to "event" and "event log".

For example, referring to FIG. 1, the TIGs 120 may also include logic to create multi-flow event logs, i.e., logs of single communication events that may be segmented into multiple flows. For example, a TIG 120 may observe and filter packets on both sides of a firewall or NAT device, which may segment a single communication event into two different flows, that may be located at the boundary between the private network and the Internet. The TIG logic may combine the two different flow logs into a single event log. Referring to FIG. 2, the logic associated with flows, flow logging, and auto-logging associated with flows may be similarly applied to events, event logging, and auto-logging associated with events.

Whereas the currently observed and filtered packet and/or associated packet log may contain or be associated with the information needed to determine the flow associated with the packet (for example, the 5-tuple information that may characterize a flow), this may not be the case for the threat/attack incident that the packet may be associated with, particularly when the incident may be characterized as being composed of multiple different flows occurring at a relatively high rate. Thus, determining the incident(s) associated with the packet and managing the associated incident logging may require the additional logic and data structures of the present disclosure.

Consider an efficient incident tracking data structure, for example, a linked list implemented as an (efficient) Least Recently Used (LRU) cache, for managing incidents and associated incident logs. Each entry, or element, in the incident tracking list may be an incident log and associated incident identifier/characterization information for each separate incident observed by the associated TIG. Accordingly, each entry/element/incident in the list may be uniquely characterized by a "key" value that may be derived from information contained in a flow log so that when a flow log is forwarded to the incident tracking logic, for example as in Step 2-8 discussed above, then the flow log may be associated with an entry in an incident list. For example, the (many) different flows composing a port scan attack often originate from a small collection of hosts with IPv4 addresses from the same (small) subnet address, for example, from the same /24 subnet address or even from the same /32 subnet address (i.e., a single host/IP address). Thus, an incident that is a port scan attack may be uniquely characterized by a key value that may be, for example, the /24 subnet address of the source IP addresses associated with the flows composing the attack. Therefore, when the incident tracking logic receives a flow log, the logic may compute the key (e.g., the /24 subnet address of the flow), and then search a port scan attack incident list for an entry with the same key. If an entry is found, then the flow log may be incorporated into the associated incident log. If an entry is not found, then a new entry (i.e., a new incident to track) may be inserted into the list and populated with a (new) incident log that is derived from the current flow log.

Note that for cyberanalytic purposes, the key value for a flow log and associated incident for port scan attacks may be, for example, a combination of a subnet address and the identifier/name of the CTI Provider associated with the flow log and/or the identifier/name of the CTI feed associated with the flow log.

Whereas a subnet address for the originating Internet hosts may uniquely characterize an incident that is a port scan attack and may serve as an effective key (or component of a key) for an associated port scan incident tracking list, for other types of attacks, for example a portsweep attack, a different characterization and associated key may be needed to uniquely identify/characterize the associated incident. Accordingly, a separate or different incident tracking list may be used to manage portsweep attack incidents vs. the incident tracking list for managing port scan attacks described above. In general, for each type of incident that may be uniquely characterized using different criteria and thus a different type of key, a separate incident tracking list for each incident type may be used.

For example, in a typical portsweep attack, the attacker may scan a single port, for example the well-known port 1433 (SQL Server), on many, most, or all (public) IP addresses of the target/victim network to see if a specific service, for example SQL Server, is open/available on an Internet-addressable host connected to the target network. Thus, an incident that may be a portsweep attack may be uniquely characterized by a key value that is composed of, for example, the single (well-known) port value associated with the many different flows composing the portsweep attack. Therefore, when the incident tracking logic receives a flow log, the logic may compute the key for a portsweep incident (e.g., the destination port value associated with the flow, which for cyberanalytic purposes may be combined with the identifier/name of the CTI Provider associated with the flow log and/or the identifier/name of the CTI feed associated with the flow log) and then search a portsweep attack incident list for an entry with the same key. If an entry is found, then the flow log may be incorporated into the associated incident log. If an entry is not found, then a new entry (i.e., a new portsweep incident) may be inserted into the list and populated with a (new) incident log that is derived from the current flow log.

Similar to the forwarding criteria for flow logging, each entry in an incident tracking list may be associated with one or more forwarding criteria that determines under what conditions the associated incident log is forwarded toward, for example, the SOC(s) that may be associated with the TIG 120. Because incident logging may be expected to massively reduce resources consumed by logging associated with incidents that are composed of many different flows occurring at a relatively high rate, the forwarding criteria may be based on a combination of aspects such as quantity of flows, (estimated or otherwise determined) rate of flows, time/reporting intervals (e.g., forwarding the current incident log every 30 seconds during the incident lifetime), current logging mode, transitions to different modes, threat awareness lag, cyberanalytical value, and/or the like, that may be associated with the incident, its initiation time, and/or the current time. To reduce resource consumption compared to the corresponding flow logging, in general an incident log may be forwarded after multiple associated flows have occurred since the incident's start time and/or since the most recent forwarding of the incident log. Also, the rate of flow logs may be used by auto-logging logic to transition between logging modes. For example, if the current mode is flow logging and the rate of flow logs exceeds a (configurable, e.g., predetermined) threshold value, then the logging mode may transition to incident logging; conversely, if the current mode is incident logging and the rate of flow logs drops below a (configurable, e.g., predetermined) threshold value (which may or may not be the same threshold value for measuring when the rate of flows exceeds a threshold), then the logging mode may transition to flow logging. Auto-capture logic may be coupled with logging mode transitions such that, for example, when the logging mode transitions from flow logging to incident logging, then packet capture halts ("no-capture" mode); conversely, when the logging mode transitions from incident logging to flow logging, then packet capture may resume in "partial-capture" or "full-capture" mode.

Because of the bursty nature of network traffic, the potentially high rate of flows, a desire to reduce or even minimize compute resource consumption, and the usefulness of estimating or otherwise determining rates for each entry in each incident tracking list managed by the incident tracking logic, it may be advantageous that the estimated or otherwise determined rate computation be efficient, accurate, and robust to bursty behavior. The rate computation logic may monitor and continually estimate or otherwise determine the current average time interval between flow logs associated with an incident, or inversely may monitor and continually estimate the rate that flow logs are received. Those average intervals or rates may be estimated or otherwise determined, for example, based on an exponentially weighted moving average (EWMA) method, or based on an exponential smoothing method. Exponential smoothing is time and space efficient because each update to the estimate after each flow log has been received requires only a constant-time computation (typically two multiplications and one addition), and typically only three values need be stored at any time (for each managed incident, i.e., for each incident in each incident list). Note that an exponential smoothing method may be used similarly to compute packet rates when, for example, computing forwarding criteria for flow logging.

Referring to FIG. 3, an example of an adaptive incident logging logic and process may operate as follows. The process will be described by way of example as being at least partially performed by any of the TIGs 120 of FIG. 1. However, the process may be partially or fully performed by one or more other types of network appliances.

Step 3-1: A flow log 603 (FIG. 6) may be generated by, and received from, the flow logging logic of a TIG 120.

Step 3-2: For each incident list 604 of a plurality of potential incident lists:

Step 3-3: Each incident list 604 may have one or more entries indexed by an (usually different) incident key. For the current incident list 604, the TIG 120 may compute an incident-specific key from the flow log.

Step 3-4: The TIG 120 may search the current incident list for an entry (corresponding to an incident) with an incident key that matches the flow log key that was determined in Step 3-3. If a match is found, then in Step 3-4T the TIG 120 may incorporate the flow log 603 from Step 3-1 into the incident list 604; else, in Step 3-4F the TIG 120 may insert a new entry (corresponding to a new incident) in the current incident list 604 corresponding to an incident log 605 derived from the flow log 603 and with the incident key for that new entry set to the incident-specific key that was determined in Step 3-3.

Step 3-5: The TIG 120 may update the incident log 605 forwarding parameters, auto-log parameters and/or mode, and/or auto-capture parameters and/or mode, which may include changing auto-log and/or auto-capture modes. The parameters and/or mode may be updated based on one or more packet, flow, and/or incident measurements, and/or based on the filtering rules and/or other rules that define when auto-log parameters and mode, and/or auto-capture parameters and/or mode, are to be changed, and to what values they are to be changed to. Various example conditions have been described herein for determining when and whether parameters and modes should be changed. For example, TIG 120 may, based on a determination that the flow logging rate is low (for instance, the flow logging rate has dropped below a threshold flow logging rate, which may be predetermined), change the auto-log parameters and/or mode to flow logging mode, and/or to change the auto-capture parameters to cause TIG 120 to be in a different auto-capture mode.

Step 3-6: Determine if the current incident log 605 should be forwarded, for example, sent to the SOC(s) associated with this TIG. For example, the incident log 605 may be associated with a rule (which may be part of or in addition to the filtering rules) that the incident log 605 is emitted periodically, such as every thirty seconds or any other time period. If so, then if an "incident-log" directive is in effect or the current "auto-log" mode parameter indicates "incident logging", then forward the incident log 605. Return to Step 3-2 to process next incident list 604 (if any).

Any of the elements described herein or illustrated in any of the figures, such as any of TIGs 120, may be partially or fully implemented using one or more computing devices.

Figure 4:
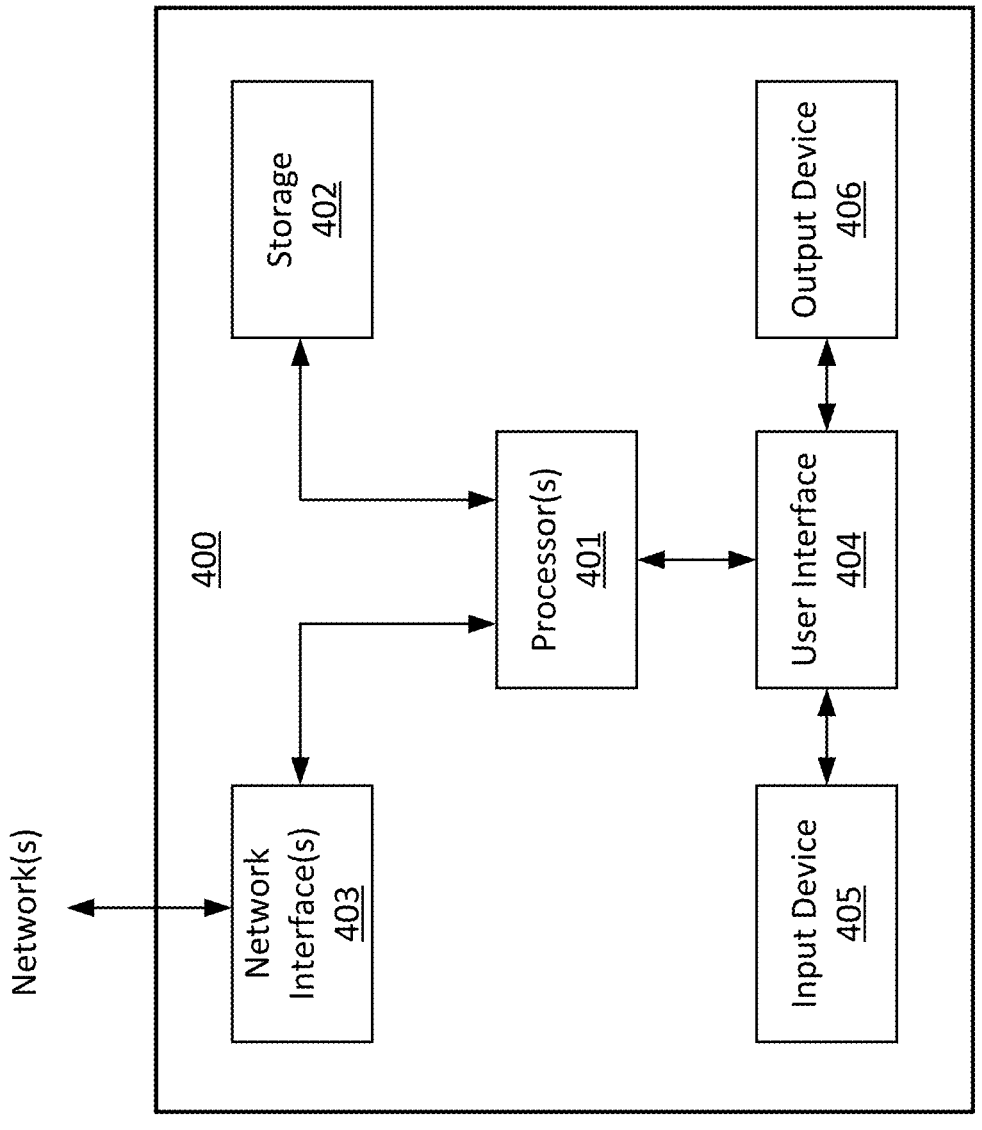
FIG. 4 shows an example computing device that may be used to implement any of the devices, systems, and methods described herein.

Hardware elements of an example computing device 400, which may be used to implement any of the other elements described herein, are shown in FIG. 4. Any of these hardware elements, and/or the computing device 400 itself, may be emulated in a virtual version of computing device 400. Computing device 400 may include one or more processors 401 that may execute computer-readable instructions of a computer program to perform any of the functions or other operations described herein. The instructions, along with other data, may be stored in storage 402, which may include, for example, memory such as read-only memory (ROM) and/or random access memory (RAM), a hard drive, a magnetic or optical disk, a Universal Serial Bus (USB) drive, and/or any other type of computer-readable media. Computing device 400 may also include a user interface 404 for interfacing with one or more input devices 405 such as a keyboard, mouse, voice input, etc., and for interfacing with one or more output device 406 such as a display, speaker, printer, etc. Computing device 400 may also include one or more network interfaces 403 for interfacing with one or more external devices and/or networks external to computing device 400. Although FIG. 4 shows an example hardware configuration, one or more of the elements of computing device 400 may be implemented as software or a combination of hardware and software. Modifications may be made to add, remove, combine, divide, etc. components of computing device 400. Additionally, the elements shown in FIG. 4 may be implemented using basic computing devices and components that have been configured to perform operations such as are described herein. Processor(s) 401 and/or storage 402 may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic.

Figure 5:
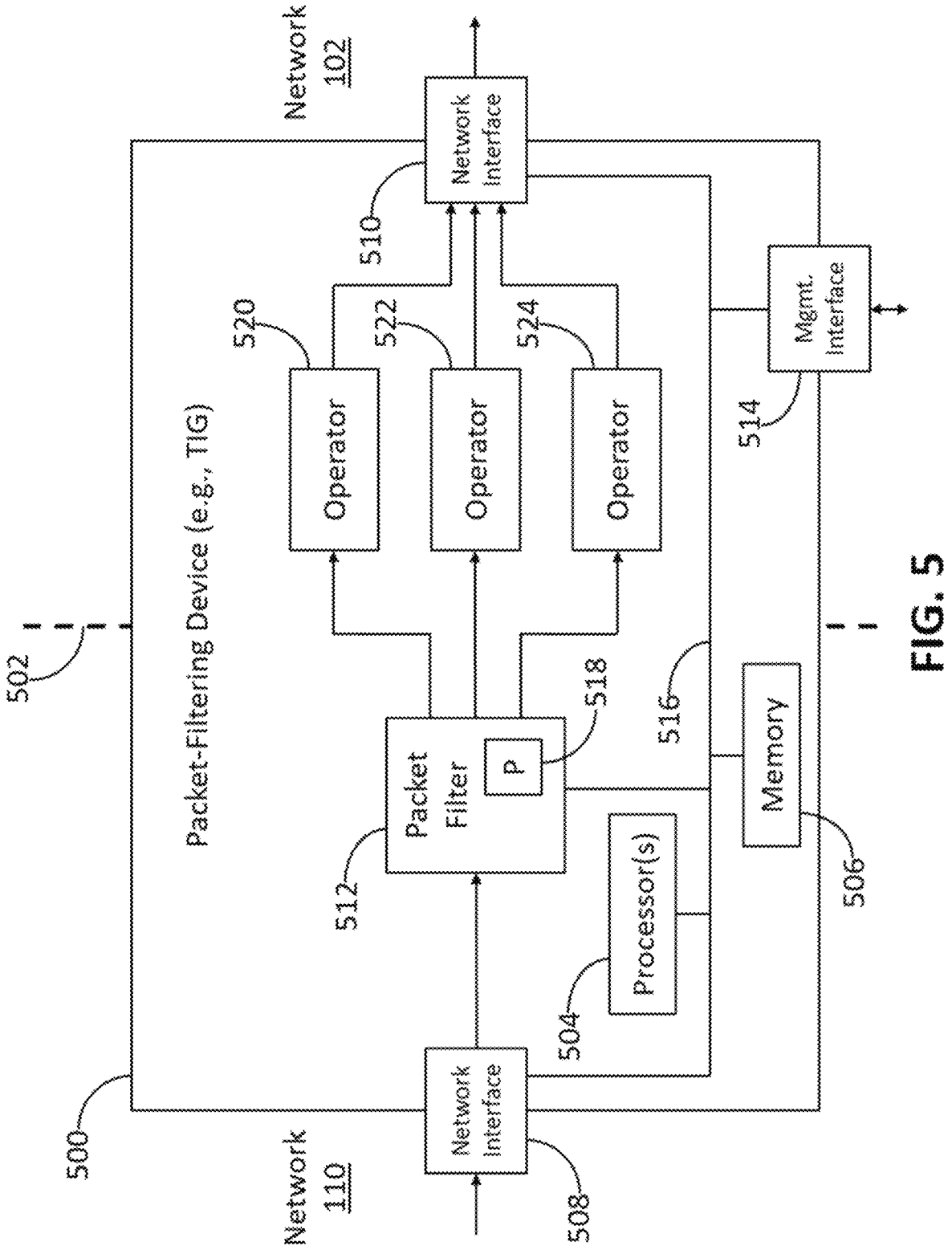
FIG. 5 shows an example packet-filtering device that may be used to implement any of the devices, systems, and methods described herein.

As explained above, computing device 400 may be embodied, for example, as a packet-filtering device such as a TIG (e.g., any of TIGs 120). An example block diagram of such a packet-filtering device 500, which may be located at a boundary 502 of a network such as network 102 (or, for example, networks 104 or 108) is shown in FIG. 5. Thus, packet-filtering device 500 is one example implementation of computing device 400. Packet filtering device 500 may comprise one or more processors 504 (which may be the same as processor(s) 401), memory 506 (which may be the same as storage 402), network interface(s) 508 and/or 510 (which may be the same as network interface 403), packet filter 512 (which may be performed by processor(s) 601), and management interface 514 (which may be performed by processor(s) 401, user interface 404, input device 405, and/or output device 406). Processor(s) 504, memory 506, network interfaces 508 and/or 510, packet filter 512, and/or management interface 514 may be interconnected via a data bus 516 (which may be the arrows interconnecting any of the various elements in FIG. 4 and FIG. 5). Network interface 510 may connect packet filtering device 500 to a first network such as network 102 (or 104 or 108). Similarly, network interface 508 may connect packet-filtering device 500 to a second network such as network 110. Memory 506 may include one or more program modules that, when executed by processor(s) 504, may configure packet-filtering device 500 to perform one or more of various functions described herein.

Packet-filtering device 500 may be configured to receive a policy (such as the filtering rules described herein) from one or more security policy management servers (e.g., SPMS(s) 150, shown in FIG. 1). For example, packet-filtering device 500 may receive a policy 518 from a security policy management server via management interface 514 (e.g., via out-of-band signaling) or network interface 508 (e.g., via in-band signaling). Packet-filtering device 500 may comprise one or more packet filters or packet discriminators, and/or logic for implementing one or more packet filters or packet discriminators. For example, packet-filtering device 500 may comprise packet filter 512, which may be configured to examine information associated with packets received by packet-filtering device 500 (e.g., from network 110) and forward such packets to one or more of operators 520, 522, and/or 524 (which may be implemented as hardware and/or as software executed by processor(s) 504) based on the examined information. For example, packet filter 512 may examine information associated with packets received by packet-filtering device 500 (e.g., packets received from network 110 via network interface 508) and forward the packets to one or more of operators 520, 522, or 524 based on the examined information.

Policy 518 may include one or more filtering rules, and the configuration of packet filter 512 may be based on one or more of the rules included in policy 518. For example, policy 518 may include one or more rules specifying that packets having specified information should be forwarded to operator 520, that packets having different specified information should be forwarded to operator 522, and that all other packets should be forwarded to operator 524. Operators 520, 522, and/or 524 may be configured to perform one or more functions on packets they receive from packet filter 512. For example, one or more of operators 520, 522, and/or 524 may be configured to forward packets received from packet filter 512 into network 102, forward packets received from packet filter 512 to an IPsec stack (not illustrated) having an IPsec security association corresponding to the packets, or drop packets received from packet filter 512. In some embodiments, one or more of operators 520, 522, and/or 524 may be configured to drop packets by sending the packets to a local "infinite sink" (e.g., the /dev/null device file in a UNIX/LINUX system).

Also, one or more of operators 520, 522, and/or 524 may be configured to trigger any of the packet logging, flow logging, and/or incident logging functions described herein, based on one or more filtering rules set forth in policy 518. For example, if one or more packets are determined by operator 522 to match or otherwise satisfy one or more rules, then operator 522 may send information to processor(s) 504 indicating this (e.g., indicating which rule(s) are satisfied, and/or indicating logging parameters that should be used). In turn, processor(s) 504 may initiate, adapt, and/or terminate an appropriate type of logging. Any of the packet logs, flow logs, incident logs, and/or lists, tables, and/or indices associated with these as described herein (such as those shown in FIG. 6), may be generated by processor(s) 504 and stored by processor(s) 504 in local memory 506. Furthermore, any emissions (e.g., reporting) of these logs and other information, as described herein, may be performed by processor(s) 504 causing the information stored in memory 506 to be sent from packet-filtering device 500, such as via management interface 514, network interface 508, and/or network interface 510.

In general, the functions and steps described herein may be embodied in computer-usable data or computer-executable instructions, such as in one or more program modules, executed by one or more computing devices (e.g., computers or other data-processing devices such as computing device 400 or packet-filtering device 500) to perform one or more functions described herein. Generally, program modules may include routines, programs, objects, components, data structures, and/or other elements that perform particular tasks or implement particular abstract data types when executed by one or more processors of one or more computing devices. The computer-executable instructions may be stored on a computer-readable medium such as a hard disk, optical disk, removable storage media, and/or solid-state or other memory such as RAM, etc. (e.g., storage 402 or memory 506). As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Non-limiting examples of concepts described in the present disclosure are set forth in the following numbered clauses:

1. A method comprising:
   logging, by a packet-filtering device and based on one or more packet filter rules, a plurality of packets;
   determining one or more flows associated with the plurality of packets;
   determining one or more incidents associated with the one or more flows; and
   logging the one or more incidents in an incident log.

2. The method of clause 1, further comprising periodically reporting the logged one or more incidents.

3. The method of clause 1 or clause 2, wherein the logging the one or more incidents is performed based on a determination that a flow logging rate has exceeded a threshold packet flow rate.

4. The method of any of the previous clauses, further comprising, for each of the one or more incidents:
   determining an incident key based on hashing one or more values associated with at least one of the one or more flows; and
   associating the incident key with at least one of the one or more incidents in the incident log.

5. The method of any of the previous clauses, further comprising determining an auto-capture mode, and wherein logging at least one of the plurality of packets is performed in accordance with the auto-capture mode, and wherein the auto-capture mode is selected from a plurality of auto-capture modes that comprise a full-packet capture mode and a partial-packet capture mode.

6. The method of any of the previous clauses, wherein the incident log is stored locally by the packet-filtering device.

7. A method comprising:
   logging, by a packet-filtering device, a plurality of packets;
   logging a plurality of flows associated with the plurality of packets, to produce a plurality of flow logs; and performing incident logging to produce at least one incident log that efficiently incorporates at least some of the plurality of flow logs.

8. The method of clause 7, wherein the at least one incident log allows for reduction of resource consumption while improving the informational/cyberanalytical value of the at least one incident log for cyberanalysis when compared to the at least some of the plurality of flow logs.

9. The method of clause 7 or clause 8, further comprising automatically switching on or off incident logging based upon a combination of resource consumption and informational/cyberanalytical value.

10. The packet-filtering device of any of clauses 1-9, wherein the packet-filtering device comprises:
    one or more processors; and
    a non-transitory computer-readable medium storing instructions that, when executed by the one or more processors, cause the packet filtering device to perform the method of any of claims 1-9.

11. A non-transitory computer-readable medium storing instructions that, when executed by the packet-filtering device, cause the packet filtering device to perform the method of any of clauses 1-9.

Although not required, one of ordinary skill in the art will appreciate that various aspects described herein may be embodied as a method, system, apparatus, or one or more computer-readable media storing computer-executable instructions that, when executed by one or more processors of a computing device, cause the computing device to perform steps as disclosed herein. Accordingly, aspects may take the form of an entirely hardware embodiment, an entirely software embodiment, an entirely firmware embodiment, an entirely virtual embodiment, or an embodiment combining software, hardware, virtualized, and/or firmware aspects in any combination.

As described herein, the various methods and acts may be operative across one or more physically separate or integrated computing devices (which together may form a computing device) and networks. The functionality may be distributed in any manner or may be located in a single physical computing device or virtual version of a computing device (e.g., a server, client computer, a user device, a virtual environment, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional.

The invention claimed is:

1. A packet-filtering device comprising:
   one or more processors; and
   memory storing instructions that, when executed by the one or more processors, cause the packet-filtering device to:
      receive a plurality of packet-filtering rules configured to cause the packet-filtering device to identify packets corresponding to at least one of a plurality of threat indicators, wherein each of the plurality of packet-filtering rules was generated based on a plurality of cyber threat intelligence reports from one or more cyber threat intelligence providers, wherein the plurality of cyber threat intelligence reports comprises the plurality of threat indicators, and wherein the plurality of threat indicators identify a plurality of subnet addresses;

determine that a received first plurality of packets, associated with a first plurality of flows, matches at least one of the plurality of packet-filtering rules;

based on determining that the first plurality of packets matches at least one of the plurality of packet-filtering rules, determine that the first plurality of packets originate from one or more of the identified subnet addresses;

based on determining that the first plurality of packets originate from one or more of the identified subnet addresses, generate first flow log data comprising information about the first plurality of flows;

send the first flow log data to another device;

identify, based on determining that a flow logging rate satisfies a threshold flow logging rate, an incident associated with at least some of the first plurality of flows;

determine that a received second plurality of packets, associated with a second plurality of flows, matches at least one of the plurality of packet-filtering rules;

based on determining that the second plurality of packets matches at least one of the plurality of packet-filtering rules, determine that the second plurality of packets originate from one or more of the identified subnet addresses;

based on determining that the second plurality of packets originate from one or more of the identified subnet addresses, generate incident log data associating the incident with the second plurality of flows; and send, to another device, the incident log data in lieu of second flow log data for the second plurality of flows.

2. The packet-filtering device of claim 1, wherein the incident log data indicates a start time of the incident.

3. The packet-filtering device of claim 1, wherein the incident log data indicates one or both of a flow volume or a flow rate associated with the incident.

4. The packet-filtering device of claim 1, wherein determining that the flow logging rate satisfies the threshold flow logging rate comprises determining that the flow logging rate exceeds the threshold flow logging rate.

5. The packet-filtering device of claim 1, wherein determining that the first plurality of packets originate from one or more of the identified subnet addresses comprises determining that the first plurality of packets originate from multiple subnet addresses of the identified subnet addresses.

6. The packet-filtering device of claim 1, wherein the instructions, when executed by the one or more processors, further cause the packet-filtering device to:

determine a key associated with the incident and based on the one or more of the plurality of subnet addresses from which the first plurality of packets originate, wherein the incident log data comprises the key.

7. The packet-filtering device of claim 1, wherein the instructions, when executed by the one or more processors, further cause the packet-filtering device to:

determine a key based on hashing one or more values associated with at least one flow of the second plurality of flows, wherein the incident log data comprises the key.

8. A non-transitory computer-readable medium storing instructions that, when executed, configure a packet-filtering device to:

receive a plurality of packet-filtering rules configured to cause the packet-filtering device to identify packets corresponding to at least one of a plurality of threat indicators, wherein each of the plurality of packet-filtering rules was generated based on a plurality of cyber threat intelligence reports from one or more cyber threat intelligence providers, wherein the plurality of cyber threat intelligence reports comprises the plurality of threat indicators, and wherein the plurality of threat indicators identify a plurality of subnet addresses;

determine that a received first plurality of packets, associated with a first plurality of flows, matches at least one of the plurality of packet-filtering rules;

based on determining that the first plurality of packets matches at least one of the plurality of packet-filtering rules, determine that the first plurality of packets originate from one or more of the identified subnet addresses;

based on determining that the first plurality of packets originate from one or more of the identified subnet addresses, generate first flow log data comprising information about the first plurality of flows;

send the first flow log data to another device;

identify, based on determining that a flow logging rate satisfies a threshold flow logging rate, an incident associated with at least some of the first plurality of flows;

determine that a received second plurality of packets, associated with a second plurality of flows, matches at least one of the plurality of packet-filtering rules;

based on determining that the second plurality of packets matches at least one of the plurality of packet-filtering rules, determine that the second plurality of packets originate from one or more of the identified subnet addresses;

based on determining that the second plurality of packets originate from one or more of the identified subnet addresses, generate incident log data associating the incident with the second plurality of flows; and send, to another device, the incident log data in lieu of second flow log data for the second plurality of flows.

9. The non-transitory computer-readable medium of claim 8, wherein the incident log data indicates a start time of the incident.

10. The non-transitory computer-readable medium of claim 8, wherein the incident log data indicates one or both of a flow volume or a flow rate associated with the incident.

11. The non-transitory computer-readable medium of claim 8, wherein determining that the flow logging rate satisfies the threshold flow logging rate comprises determining that the flow logging rate exceeds the threshold flow logging rate.

12. The non-transitory computer-readable medium of claim 8, wherein determining that the first plurality of packets originate from one or more of the identified subnet addresses comprises determining that the first plurality of packets originate from multiple subnet addresses of the identified subnet addresses.

13. The non-transitory computer-readable medium of claim 8, wherein the instructions, when executed, further configure the packet-filtering device to:

determine a key associated with the incident and based on the one or more of the plurality of subnet addresses from which the first plurality of packets originate, wherein the incident log data comprises the key.

14. The non-transitory computer-readable medium of claim 8, wherein the instructions, when executed, further configure the packet-filtering device to:

determine a key based on hashing one or more values associated with at least one flow of the second plurality of flows, wherein the incident log data comprises the key.

15. A method performed by a packet-filtering device, the method comprising:

receiving a plurality of packet-filtering rules configured to cause the packet-filtering device to identify packets corresponding to at least one of a plurality of threat indicators, wherein each of the plurality of packet-filtering rules was generated based on a plurality of cyber threat intelligence reports from one or more cyber threat intelligence providers, wherein the plurality of cyber threat intelligence reports comprises the plurality of threat indicators, and wherein the plurality of threat indicators identify a plurality of subnet addresses;

determining that a received first plurality of packets, associated with a first plurality of flows, matches at least one of the plurality of packet-filtering rules;

based on determining that the first plurality of packets matches at least one of the plurality of packet-filtering rules, determining that the first plurality of packets originate from one or more of the identified subnet addresses;

based on determining that the first plurality of packets originate from one or more of the identified subnet addresses, generating first flow log data comprising information about the first plurality of flows;

sending the first flow log data to another device;

identifying, based on determining that a flow logging rate satisfies a threshold flow logging rate, an incident associated with at least some of the first plurality of flows;

determining that a received second plurality of packets, associated with a second plurality of flows, matches at least one of the plurality of packet-filtering rules;

based on determining that the second plurality of packets matches at least one of the plurality of packet-filtering rules, determining that the second plurality of packets originate from one or more of the identified subnet addresses;

based on determining that the second plurality of packets originate from one or more of the identified subnet addresses, generating incident log data associating the incident with the second plurality of flows; and sending, to another device, the incident log data in lieu of second flow log data for the second plurality of flows.

16. The method of claim 15, wherein the incident log data indicates a start time of the incident.

17. The method of claim 15, wherein the incident log data indicates one or both of a flow volume or a flow rate associated with the incident.

18. The method of claim 15, wherein determining that the first plurality of packets originate from one or more of the identified subnet addresses comprises determining that the first plurality of packets originate from multiple subnet addresses of the identified subnet addresses.

19. The method of claim 15, further comprising:

determining a key associated with the incident and based on the one or more of the plurality of subnet addresses from which the first plurality of packets originate, wherein the incident log data comprises the key.

20. The method of claim 15, further comprising:

determining a key based on hashing one or more values associated with at least one flow of the second plurality of flows, wherein the incident log data comprises the key.

* * * * *